United States Patent [19]

Hirsh et al.

[11] Patent Number: 5,973,896
[45] Date of Patent: *Oct. 26, 1999

[54] SHOCK AND ARC PROTECTION DEVICE FOR AN ELECTRICAL DISTRIBUTION SYSTEM

[75] Inventors: Stanley S. Hirsh, El Paso, Tex.; David C. Nemir, 1065 Doniphan Park Cir., #B, El Paso, Tex. 79902

[73] Assignee: David C. Nemir, El Paso, Tex.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/756,784

[22] Filed: Nov. 26, 1996

Related U.S. Application Data

[63] Continuation-in-part of application No. 08/653,943, May 22, 1996, Pat. No. 5,844,759, and a continuation-in-part of application No. 08/453,664, May 26, 1995, abandoned.

[51] Int. Cl.⁶ ........................................... H02H 9/00
[52] U.S. Cl. .................................. 361/54; 361/58
[58] Field of Search ........................... 361/42–50, 54, 361/56, 58, 88, 93, 100, 101, 111

[56] References Cited

U.S. PATENT DOCUMENTS

| | | | |
|---|---|---|---|
| 2,061,347 | 11/1936 | Coe | 177/311 |
| 3,252,052 | 5/1966 | Nash | 317/18 |
| 3,313,960 | 4/1967 | Borys | 307/127 |
| 3,600,635 | 8/1971 | Neilson | 317/33 SC |
| 3,806,845 | 4/1974 | Zubaty et al. | 335/18 |
| 3,872,355 | 3/1975 | Klein et al. | 317/18 D |
| 3,936,699 | 2/1976 | Adams | 317/18 D |
| 3,970,976 | 7/1976 | Gryctko | 335/18 |
| 3,997,818 | 12/1976 | Bodkin | 317/33 SC |
| 4,029,996 | 6/1977 | Miffitt | 307/326 |
| 4,031,431 | 6/1977 | Gross | 307/326 |
| 4,040,117 | 8/1977 | Houser | 361/33 |
| 4,042,967 | 8/1977 | Yamamoto | 361/45 |
| 4,091,434 | 5/1978 | Suzuki | 361/100 |
| 4,216,515 | 8/1980 | Van Zeeland | 361/45 |
| 4,347,540 | 8/1982 | Gary et al. | 361/47 |
| 4,353,103 | 10/1982 | Whitlow | 361/45 |
| 4,464,582 | 8/1984 | Aragaki et al. | 307/118 |
| 4,520,417 | 5/1985 | Frank | 361/45 |
| 4,577,094 | 3/1986 | Mills | 219/505 |
| 4,639,817 | 1/1987 | Cooper et al. | 361/62 |
| 4,649,454 | 3/1987 | Winterton | 361/50 |
| 4,658,322 | 4/1987 | Rivera | 361/37 |
| 4,707,759 | 11/1987 | Bodkin | 361/48 |
| 4,734,843 | 3/1988 | Beddoe | 363/50 |
| 4,751,603 | 6/1988 | Kwan | 361/42 |
| 4,763,365 | 8/1988 | Gerondale et al. | 4/542 |
| 4,797,772 | 1/1989 | Kaplanis | 361/42 |
| 4,802,052 | 1/1989 | Brant et al. | 361/42 |
| 4,829,390 | 5/1989 | Simon | 361/49 |
| 4,843,514 | 6/1989 | Bodkin | 361/50 |

(List continued on next page.)

*Primary Examiner*—Ronald W. Leja
*Attorney, Agent, or Firm*—Jeffrey D. Myers; Deborah A. Peacock

[57] ABSTRACT

An apparatus and method for electrical shock protection and electrical arc fault protection in an electrical distribution system. The invention consists of a current interrupting circuit that impedes electrical current flow during short time intervals in each half cycle of an AC source. If a shock hazard or electrical arc fault condition occurs during this short time interval, it results in current flow that is sensed at a load center, causing a circuit interrupter to open and preventing current flow to the distribution system for a period of time as short as one half cycle. When the fault is removed, that event is detected within one half cycle and power is restored to the load thus implementing an automatic reset. The invention is well suited for the retrofit of existing electrical distribution systems using the existing wiring.

54 Claims, 16 Drawing Sheets

U.S. PATENT DOCUMENTS

| | | | |
|---|---|---|---|
| 4,853,822 | 8/1989 | Kamijo | 361/100 |
| 4,858,054 | 8/1989 | Franklin | 361/57 |
| 4,860,147 | 8/1989 | Fai | 361/50 |
| 4,878,144 | 10/1989 | Nebon | 361/96 |
| 4,903,162 | 2/1990 | Kopelman | 361/103 |
| 4,912,588 | 3/1990 | Thome | 361/45 |
| 4,931,893 | 6/1990 | Glennon et al. | 361/45 |
| 4,931,894 | 6/1990 | Legatti | 361/45 |
| 4,954,922 | 9/1990 | Gaus et al. | 361/42 |
| 4,979,070 | 12/1990 | Bodkin et al. | 361/42 |
| 5,047,724 | 9/1991 | Boksiner et al. | 324/520 |
| 5,109,315 | 4/1992 | Morse | 361/42 |
| 5,142,646 | 8/1992 | Nachtigall | 361/42 |
| 5,148,344 | 9/1992 | Rao et al. | 361/42 |
| 5,159,517 | 10/1992 | Bodkin | 361/49 |
| 5,166,853 | 11/1992 | Gershen et al. | 361/50 |
| 5,184,271 | 2/1993 | Doyle et al. | 361/49 |
| 5,185,584 | 2/1993 | Beihoff et al. | 361/45 |
| 5,185,685 | 2/1993 | Tennies et al. | 361/45 |
| 5,185,686 | 2/1993 | Hansen et al. | 361/45 |
| 5,185,687 | 2/1993 | Beihoff et al. | 361/45 |
| 5,200,873 | 4/1993 | Glennon | 361/45 |
| 5,206,595 | 4/1993 | Wiggins et al. | 324/535 |
| 5,206,596 | 4/1993 | Beihoff et al. | 324/536 |
| 5,208,542 | 5/1993 | Tennies et al. | 324/544 |
| 5,223,795 | 6/1993 | Blades | 324/536 |
| 5,224,006 | 6/1993 | MacKenzie et al. | 361/45 |
| 5,280,404 | 1/1994 | Ragsdale | 361/113 |
| 5,353,185 | 10/1994 | Bodkin | 361/49 |
| 5,394,289 | 2/1995 | Yao et al. | 361/42 |
| 5,420,740 | 5/1995 | MacKenzie et al. | 361/45 |
| 5,477,412 | 12/1995 | Neiger et al. | 361/45 |

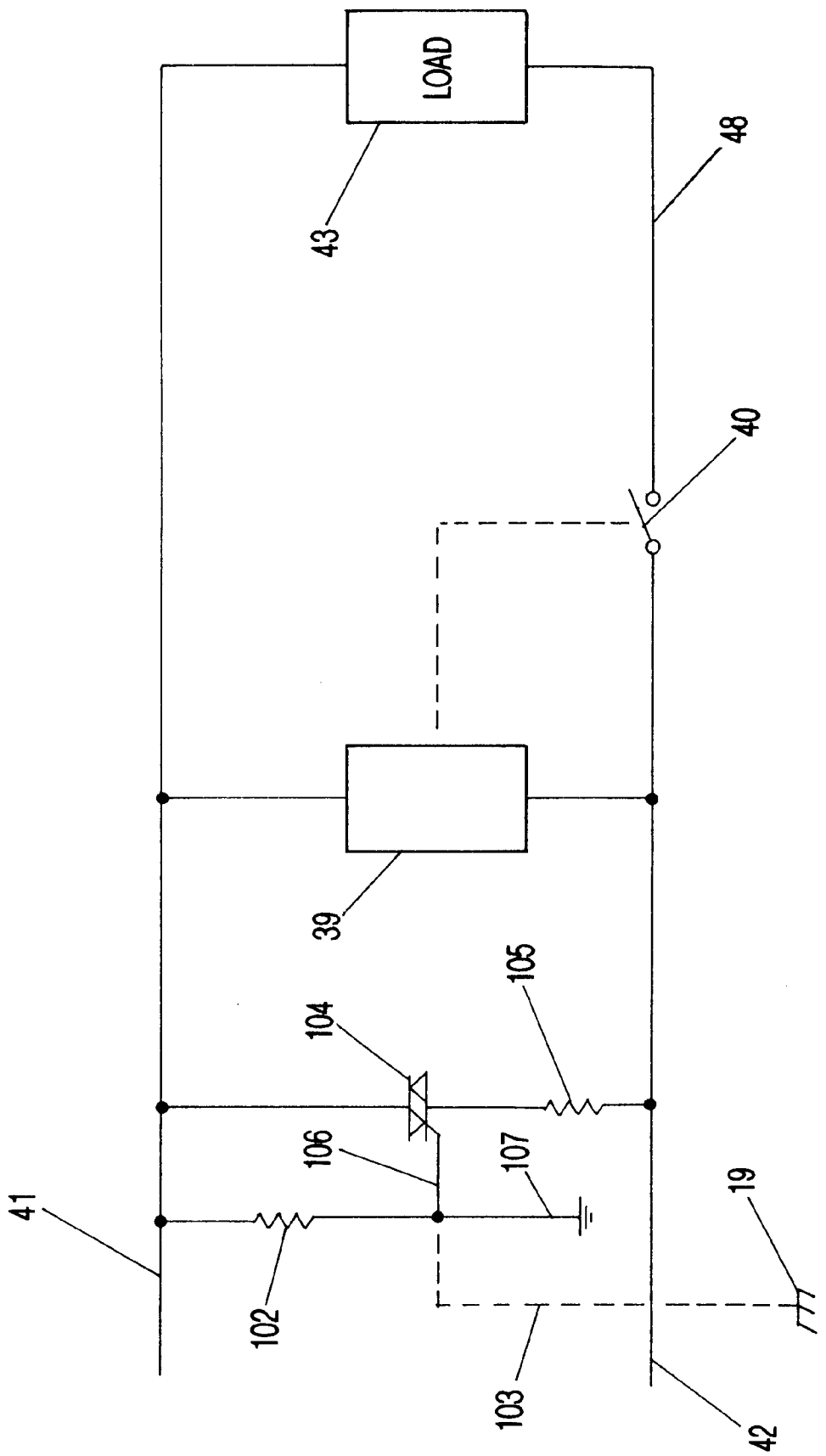

SHOCK AND ARC PROTECTION DEVICE FOR AN ELECTRICAL DISTRIBUTION SYSTEM

CROSS REFERENCE TO RELATED APPLICATIONS

This application is a continuation in part application of U.S. patent applications Ser. No. 08/453,664, entitled "Electrical Fault Interrupt with Frayed Cord Protection", to Stanley S. Hirsh and David C. Nemir, filed on May 26, 1995, now abandoned the teachings of which are incorporated herein by reference. This application is also a continuation in part application U.S. patent application of Ser. No. 08/653,943 entitled "Electrical Fault Interrupter," to Stanley S. Hirsh and David C. Nemir, filed on May 22, 1996, now U.S. Pat. No. 5,844,759 the teachings of which are incorporated herein by reference.

BACKGROUND OF THE INVENTION

1. Field of the Invention

This invention relates to electrical shock and electrical arc fault protection circuits for electrical distribution systems and more particularly, to an improved protection system that can detect and eliminate many shock hazards and arcing faults within an electrical distribution system and which automatically resets itself upon the removal of the shock hazard and/or arcing fault.

2. Background of the Invention

Any electrical device ("the load") requires the flow of electrical current in order to operate. An analogy is the flow of water through an aquarium filter. A pump takes in water from the aquarium and increases the pressure (analogous to an increase in electrical voltage) to force the water through a tube (the tube is analogous to the electrical conductor or wire) to the filter (analogous to the electrical load). The flow of water current through the tube is analogous to the flow of electrical current in a wire. Most of the water pressure is "used up" in passing through the filter so that the water coming out of the filter has a relatively low pressure. A hose conveys the low pressure water from the filter outlet back to the aquarium. If the tube connecting the pump and the filter has a hole then some of the water will pass through this hole from the high pressure in the tube to a lower pressure outside the tube. This constitutes a water leak.

In somewhat the same way, an electrical device or load receives electrical energy from one terminal of an electrical outlet or source (the so-called high voltage or "hot" side), electrical current flows to the device through an electrical conductor or wire (the hot conductor), this current passes through the load and is then returned to another terminal of the electrical outlet through another wire called the neutral wire. The neutral wire will have a very low voltage (electrical pressure) because most of the voltage will be "used up" in the act of forcing electrical current through the load.

The two wires that connect source and load may have a coating of rubber or some other electrical insulating material or they may be bare, in which case air, which is a good insulator, functions to inhibit electrical current flow outside of the wire. Since the human body can conduct the flow of electrical current, if a person comes into contact with one electrified object such as the so-called hot wire in an electrical system, while also making contact with a second object having a substantially different voltage, then an electrical leakage current that is proportional to the voltage difference will flow through the person and may cause injury or death. If the second object that the person comes in contact with is electrically connected to the earth (ground) then this is a called a hot to ground fault. If the second object that the person comes in contact with is the neutral wire this is a hot to neutral fault. If the person makes contact between the neutral wire and ground this is called a neutral to ground fault. Since the voltage difference between neutral and ground is generally small (because the neutral line is connected to ground at the load center or breaker box where power is supplied), a neutral to ground fault is generally considered to be less hazardous than a hot to ground or a hot to neutral fault. Faults can also occur through the air. An undesirable electrical current leakage path through the air is generally manifested as a high energy electrical spark or "arc" and is referred to as an arc fault.

Electrical current is the flow of electrons. Electrons are neither created nor destroyed so any functioning electrical appliance will require both an entry path for electrons and an exit path for electrons in order for electrical current to flow. In an electrical appliance, electrons may exclusively enter on one path and exit on a second (direct current or DC operation). This is analogous to the aquarium leak example. For most household appliances that operate from a plug, electrons will sometimes enter path one and exit path two and sometimes enter path two and exit path one. This is known as alternating current or AC operation.

Although the two conductors coming out of an AC power source are often designated as "hot" and "neutral", in an AC system, the hot conductor will cyclically have a more positive voltage than the neutral for half the time and will cyclically have a more negative voltage than neutral for half the time, having a momentary value of zero each time the voltage passes from positive to negative and negative to positive.

A common source of electrical injuries in the home occurs when people place radios or similar electrical devices that are operated using household AC electrical current near their pool or bath tub while swimming or bathing. If the radio is knocked into the water, it can create electrical leakage current through the water to ground creating a ground fault. A ground fault can also occur when a person touches an electrically hot conductor while standing on or touching a grounded conductive surface. When sufficient current passes through a person, electrical burns or electrocution may result. Many electrical appliances such as heaters, hair dryers, electric razors and pumps are used near water and can present this type of hazard. Even a relatively low level of electrical current leakage can be hazardous to a human. Underwriters Laboratories, in their 943 standard for ground fault interrupt devices, requires that listed devices must open in response to any leakage current exceeding six milliamperes.

Another type of undesirable operating condition occurs when an electrical spark jumps between two conductors or from one conductor to ground. This spark represents an electrical discharge through the air and is objectionable because heat is produced as a byproduct of this unintentional "arcing" path. This occurrence is known as an arc fault and is a leading cause of, and contributor to, electrical fires. The electrical current levels drawn by an arcing fault are generally several orders of magnitude higher than the six milliampere standard for the Underwriters Laboratories 943 specification.

The U.S. Consumer Products Safety Commission estimates that there were approximately 41,000 fires involving electrical wiring systems in 1992. These fires resulted in 320 deaths, 1600 injuries and $511 million in property losses. The CPSC studies also show that the occurrence of wiring system fires is disproportionately high in homes more than 40 years old [Source: Technology for Detecting and Monitoring Conditions That Could Cause Electrical Wiring System Fires, Contract Number CPSC-C-94-1112, prepared by Underwriters Laboratories September 1995]. The disproportionately high incidence of wiring system fires in older homes may be attributed to poor wiring techniques, outdated electrical components and aged or damaged insulation on conductors. The present invention could be applied as a retrofit to older homes, affording protection against the arcing faults that are a major source of wiring system fires.

Arcing faults can occur in the same places that ground faults can occur—in fact, a ground fault would be called an arcing fault if it resulted in an electrical discharge across an air gap (a spark). As such, circuits that protect against ground faults can also prevent many classes of arcing faults. However, many of the circuits that purport to protect against arcing faults cannot detect low (albeit hazardous) level ground faults.

Protection circuits known as ground fault interrupters or GFI's, are presently required by code for the bathrooms of most new homes and commercial buildings. Similar circuits are also required for Underwriter's Laboratories approval in hair dryers sold in the United States. Of the GFI circuits presently available on the market, all use a current imbalance in a current sense transformer as the means of detecting a fault Such circuits are described, for example, in U.S. Pat. No. 3,683,302 (Butler et al) and U.S. Pat. No. 4,216,515 (Van Zeeland). One problem with approaches based upon a current sense transformer is that the magnetic core can acquire a residual magnetic state subsequent to one or more differential current conditions. This can result in a circuit which is too sensitive and is subject to nuisance tripping. In order to avoid nuisance trip problems, Underwriters Laboratories, in their 943 standard, requires that ground fault interrupt circuits not trip in response to a fault current of less than 4 milliamperes, thereby reducing the incidences of nuisance trippings. While existing ground fault interrupter circuits can detect and interrupt an arcing fault from the hot conductor to ground, they cannot detect and prevent an arcing fault that occurs between a hot conductor and a neutral conductor, a source of many electrical fires within homes and businesses. The present invention can detect such an occurrence within the household wiring. In addition, the present invention is an improvement over the current sense transformer based approaches in that it does not require the transformer and, since it is has a fast autoreset, nuisance tripping is not as great a concern and the device can be made responsive to a very low level of fault condition.

A spin-off of the conventional GFI circuit that has been applied to arc fault detection/avoidance in an appliance cordset is described in U.S. Pat. No. 4,931,894 (Legatti). This device works by using a conductive metal sheath to surround each current-carrying conductor individually. An arc protection winding is located on the core of the GFI current sense transformer and is connected in series with a resistance between the metal sheath and a neutral or return line. A fault involving any current carrying conductor will involve the shield before it involves any other conductive surface and the fault current will be sensed as a ground fault, thereby tripping the interrupting device in the plug. Problems with this approach, over and above the problems inherent in any current sense transformer based approach, is that this technology (U.S. Pat. No. 4,931,894) requires special wires that have a grounded conductive shield and this prevents its use in a system where it is desirable to use existing wiring.

The late 1980's and early 1990's saw a great deal of effort directed at arc fault detection/protection circuits. For example, U.S. Pat. No. 5,224,006 (Mackenzie and Engel) describes a system whereby the magnitude and rate of change of current is monitored. If the rate of change of current has a profile characteristic of a sputtering arc fault, a circuit breaker relay is tripped. U.S. Pat. No. 4,878,144 (Garin) uses a light sensitive arc detector to detect an arcing phenomenon and then trips a circuit breaker. U.S. Pat. Nos. 4,658,322 (Rivera) and 4,903,162 (Kopelman) use heat sensing elements to detect an overtemperature condition, such as that occuring due to an arcing fault, in electrical wiring and trigger a current interrupting circuit breaker in response thereto. U.S. Pat. No. 4,848,054 (Franklin) discloses a protective circuit that trips a circuit breaker upon the detection of an overload current condition which exceeds the maximum expected during normal transient conditions of operation, such overload current condition said to be characteristic of an arcing fault. The problems with all of the above cited arc fault protection technologies is that they cannot detect a low level (non-arcing) fault current which, although of relatively small value, can still result in a painful or even lethal electrical shock.

Additional arc fault detection circuits have been proposed that look for a specific signature characteristic of the current, voltage or electromagnetic field associated with arcing faults. These technologies concentrate on detecting a specific signature characteristic because many electric devices produce arcing during normal operations. An example is an electrical light switch which may draw a spark (an arc) when opened or an electric igniter for a gas furnace. Another example of a device that arcs in normal operation is a commutated motor which will spark continuously at the brushes when energized. An arc fault detector/interrupter would be useless if it detected and tripped in response to all arcs, both good (corresponding to normal operation) and bad (corresponding to a fault condition). Examples of technologies wherein the current flow is monitored, filtered and processed to detect an arcing fault include U.S. Pat. No. 4,639,817 (Cooper and South) wherein voltage signals are measured between the three phases in an AC three phase network and bandpass limited to the frequency band between 1 and 100 kilohertz, the band which is alleged to contain harmonic frequencies indicative of an arcing fault. U.S. Pat. Nos. 5,047,724 (Boksinger and Parente) and 5,280,404 (Ragsdale) reveal methods for detecting arc faults in an electrical circuit by comparing the spectral frequency makeup of voltages and/or currents within the circuit conductors to the spectrum characteristic of an arcing event. Examples of technologies wherein an electromagnetic field is monitored, filtered and processed to detect an arcing fault include U.S. Pat. Nos. 5,185,684 (Beihoff, Tennies, Richards and O'Neil), 5,185,685 (Tennies, Beihoff, Hastings, Clarey and O'Neil), 5,185,686 (Hansen, Beihoff, Tennies and Richards), 5,185,687 (Beihoff, Tennies, Richards and O'Neil) and 5,208,542 (Tennies, Beihoff, Hansen). The present invention is an improvement over the above referenced inventions in that the above inventions are directed at detecting an arcing condition but would be unresponsive to a low level fault current which, although not resulting in an arcing fault, could deliver a painful or lethal electrical shock if the fault path was a human body. Furthermore, most of the filtering algorithms proposed by these arc fault directed inventions require a signal analysis over multiple cycles and cannot detect and respond to a fault in less than one cycle of the fundamental AC source frequency.

3. Objects and Advantages

The present invention has the following objects and advantages:

a) requires only two electrical conductors connecting the parts of an electrical distribution system (no ground wire required);

b) does not use a current sense transformer for fault detection;

c) can detect and interrupt arcing faults from the hot conductor to ground;

d) can detect and interrupt shock hazards from the hot conductor to ground;

e) can detect and interrupt an arcing fault from the hot conductor to the neutral conductor within the wiring connecting the load center and the outlets/lights in an electrical distribution system;

f) interrupts current flow within one half cycle from the occurrence of a fault;

g) electrical power is automatically restored to the device upon removal of the fault (auto-reset);

h) can be easily retrofit into existing houses or other installations without requiring a restringing of existing wiring within that house or other installation;

i) can be used to detect and prevent an open ground condition or miswired neutral at wall outlets within a home;

j) can be made to provide short circuit current limiting and protection.

Further objects and advantages of the present invention will become apparent from a description of the drawings and ensuing description. None of the prior art patents described in section 2, either alone or in any appropriate combination, anticipates or renders the disclosed invention unpatentable.

SUMMARY OF THE INVENTION

The present invention comprises an electrical system for arc fault and shock protection in an electrical distribution system. It is the principal objective of the invention to provide a device which can be used to retrofit existing distribution systems using the existing wiring in that installation. It is another objective to provide short circuit protection. It is another objective to provide fault protection in conjunction with light dimmer circuits or motor speed controls.

The objectives of this invention are obtained by using a fault sense/current interrupt circuit at an electrical load center (breaker box) within a home, office or building, together with a load conditioning circuit located at the outlets and lights that are serviced by said electrical distribution center. Under normal operation, the load conditioning circuit(s) prevent substantially all current from flowing to the light(s) and/or the load(s) at the outlet(s) during a brief time interval around the zero crossing of the applied AC power cycle. If, during this time interval when the load conditioning circuit is blocking load current, a ground fault or arc fault occurs, electrical current will flow at the distribution center due to current flowing through the fault. This will be detected by the fault sense circuitry at the distribution center, which will force the interrupt circuit to maintain an open condition, thus preventing substantial electrical current from flowing to the electrical outlets and lights that are fed by the distribution center and thereby preventing dangerous levels of electrical current from being applied to the fault during the balance of that half cycle. In each subsequent zero crossing of the AC cycle, the outlet and/or lights, along with the wiring connecting them to the distribution center will be tested briefly to establish if a fault condition is still present. If a fault condition is still present, the current interrupt remains open. If the fault condition is no longer present, the current interrupt is closed and full electrical energy is delivered to the appliance for the balance of that half cycle. In this way, the device is self resetting.

As an alternative, when a fault is detected, the current interrupt at the distribution center may be activated for a number of cycles, effectively preventing current flow for that number of cycles, irrespective of whether the fault condition is still present. This might be useful in that it would allow the circuit interrupt circuitry to cool after the occurrence of a hard short circuit.

The present invention is unique in that it uses an all solid state (electronic) design to do a job that has been traditionally done by mechanical relays and differential sense transformers. As such, it has the potential to be implemented almost entirely on a single integrated circuit. Silicon, the building block of integrated circuits, is cheap, and features such as control functions and signal conditioning can be added in silicon at little additional cost. This is particularly important from the standpoint of so-called "smart house" installations wherein all appliances within a house communicate with a central computer via the same household wiring that distributes power throughout the house. Another advantage is that the implementation will generally permit the use of existing wiring in an electrical distribution system.

An additional feature of the invention is that it allows for the incorporation of the detection and prevention of unsafe operating conditions such as when the neutral is not tied to ground or the electrical outlets are miswired.

BRIEF DESCRIPTION OF THE DRAWINGS

The above mentioned and other features and objects of this invention and the manner of obtaining them will become more apparent and the invention itself will be better understood by reference to the following description of the embodiments of the invention taken together with the accompanying drawings, wherein:

FIG. 16 is an electrical schematic of a general load conditioning circuit having additionally a circuit that can detect an open neutral or miswiring condition and thereupon generate a fault.

DESCRIPTION OF THE PREFERRED EMBODIMENTS

Figure 1:
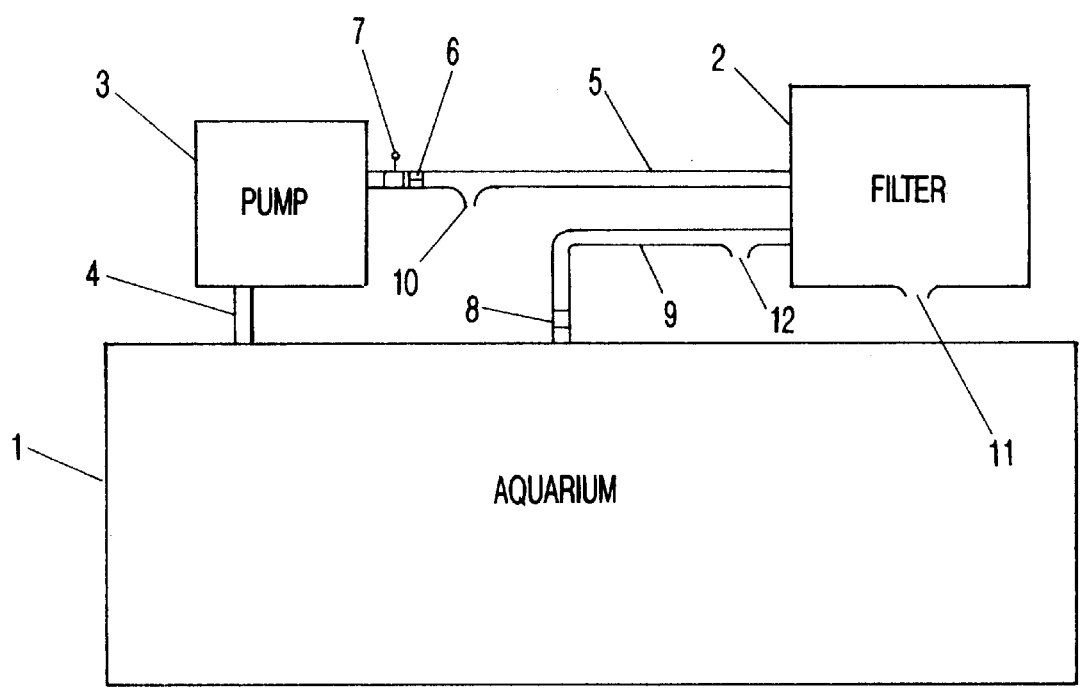
FIG. 1 depicts an aquarium pump/filter system which is analogous to the situation of sourcing electrical current to a load and furthermore depicting various analogs of electrical faults.

In order to describe the functioning of the present invention, it is helpful to look at the analogous situation of an aquarium pump and filter combination. FIG. 1 depicts a situation where water is pumped from the aquarium 1 through a filter 2 and is then returned to the aquarium 1. Water is an incompressible fluid and there is assumed to be no accumulation within the system. The pump 3 takes low pressure water from the aquarium 1 using a hose 4 and increases the pressure so that the water flows in the high pressure hose 5 from the pump 3 to the filter 2 through the pump outlet valve 7 and the flowmeter 6. The pump outlet valve 7 controls the flow of water out of the pump 3. The aquarium inlet valve 8, serves to allow or to block water flow into the aquarium 1. Both valves 7 and 8 have only two possible positions, fully open or fully closed. Leaks 10,11, 12, 13 can occur in a number of places within the system, resulting in water flowing in undesirable paths (faults) instead of through the hoses and filter.

Consider the flowmeter 6 installed between the pump outlet valve 7 and the high pressure hose 5. This flowmeter 6 detects if any water is passing from the pump 3 into the high pressure hose 5. If pump outlet valve 7 is in an open position and aquarium inlet valve 8 is in a closed position, then in the absence of leaks 10, 11 and 12 there will be no flow of water out of the pump 3 and the flowmeter 6 will not detect any flow of water. If, however, there are leaks 10 and/or 11 and/or 12 then there will be some water flowing out of the pump 3 into the high pressure hose 5 and this event can be detected by the flowmeter 6. If this occurs, then the leaks 10 and/or 11 and/or 12 may be halted by closing the pump outlet valve 7. In this way, the flowmeter 6 together with the aquarium inlet valve 8 serves to detect the presence of leaks 10 and/or 11 and/or 12. Once a leak is detected, the pump outlet valve 7 can be closed to stop the leaks by interrupting the flow of water to the high pressure hose 5.

The water leakage scenario described above is helpful in understanding the functioning of the present invention for the protection against shocks and burns due to electrical current leakage in an electrical distribution system. The key feature of this invention is that the majority of electrical current in the load is intentionally blocked from flowing during a portion of each half cycle. During this portion of each cycle when current flow to the load is inhibited, if any electrically conductive path (a leak) is present between the hot wire and ground, then electrical current will flow through this conductive path and will be sensed as a fault condition.

Figure 2:
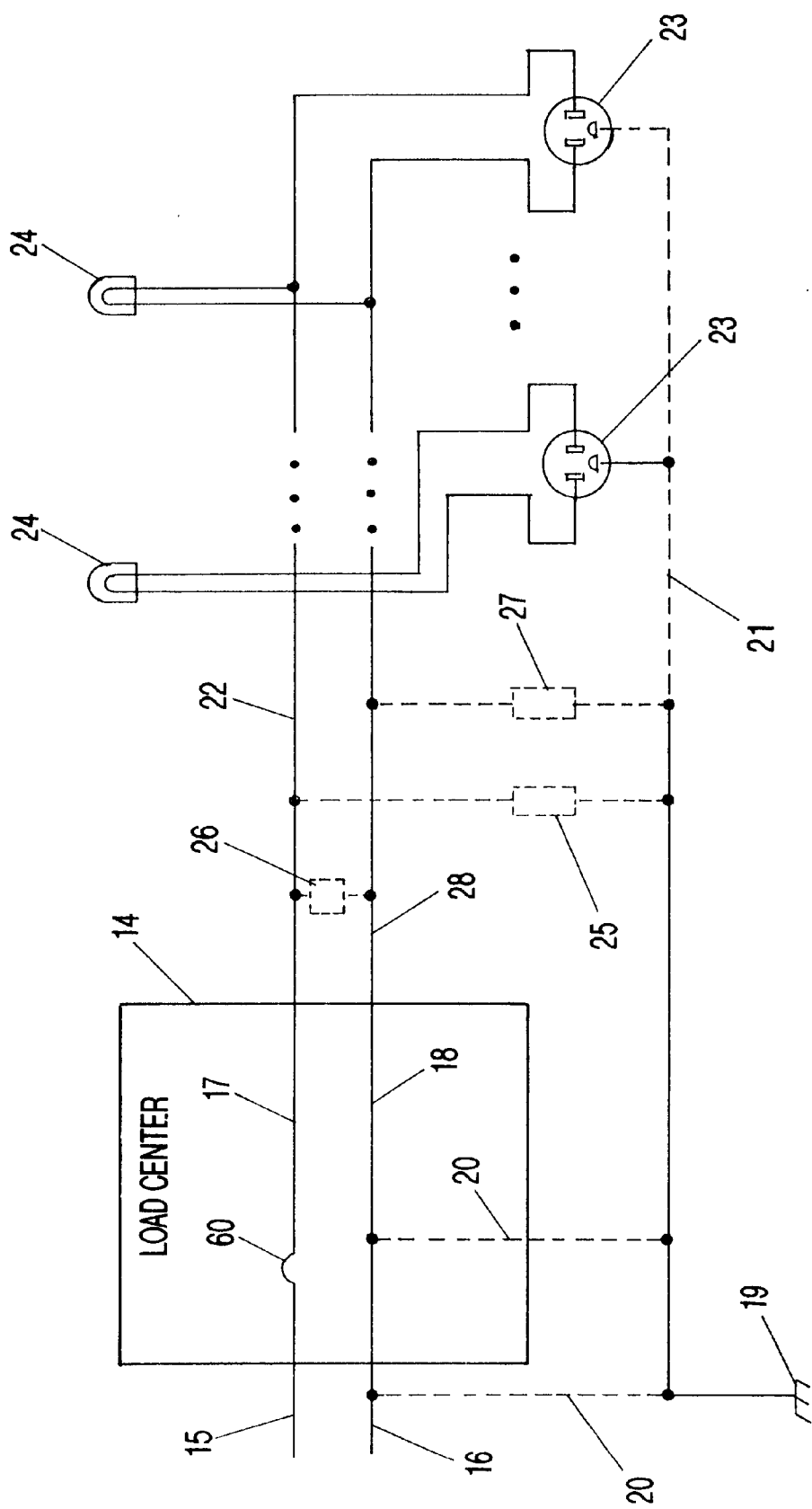
FIG. 2 depicts a block diagram of a representative connection of a building's electrical distribution system and various faults that can be present.

FIG. 2 depicts a block diagram of a representative connection of one branch in a building's electrical distribution system. The load center 14 serves as a connection location between the outside electrical service hot 15 and outside electrical service neutral 16 to the load center hot 17 and load center neutral 18. The ground 19 will generally be connected via connection 20 to outside electrical service neutral 16 at a point outside of the load center 14 and will generally also be connected via connection 20' to the load center neutral 18. In most installations and as required by code, a circuit breaker 60 is located within the load center 14 and serves to break the connection between the outside electrical service hot 15 and the load center hot 17.

The hot conductor 22 exiting the load center 14 connects to one or more wall outlets 23 and to one or more switched lights 24. The optional ground 21 is a conductive path between ground 19 and the one or more outlet(s) 23. The National Electric Code mandates that this connection be present on all new construction. This was not required on buildings that were constructed prior to about 1950 and so this connection is shown as a dotted line since it may not be present and the electrical outlets in older construction may not have a ground connection.

A hot to ground fault 25 and hot to neutral fault 26 are anomalous conditions that represent an undesirable electrical leakage path and may result in a shock or fire hazard. These faults may occur when the electrical insulation on the conductors 22 and 28 are frayed or otherwise damaged. Such damage could, for example, occur due to aging (the insulation wears out over time), due to being chewed upon by rodents and insects, or resulting from disruptions due to earthquake or other natural disaster. The hot to ground fault 25 could occur when a conductor 22 having damaged insulation makes electrical contact with a grounded conduit. The hot to ground fault 25 might also occur if a human comes into contact with an exposed conductor 22 while standing on a grounded surface in which case an electrical path would be established through the human between the hot conductor 22 and ground 19 resulting in a shock hazard. The hot to neutral fault 26 might occur if an exposed hot conductor 22 were to touch the neutral conductor 28 in which case an electrical arc might occur and this arcing could result in an electrical fire. Alternatively, a human coming in contact between the hot 22 and neutral 28 conductor would represent a hot to neutral fault 26. In a properly wired building, a neutral to ground fault 27 is not likely to result in a dangerous condition since the electrical potential difference between neutral 28 and ground 19 should be small. However, in the case of miswiring, the conductor 28 that should be at a so-called neutral potential can actually have an electrically "hot" potential, in which case a neutral to ground fault 27 can be hazardous. It is one object of the present invention to recognize a miswiring condition as a fault, thereby avoiding a hazardous condition.

Figure 3:
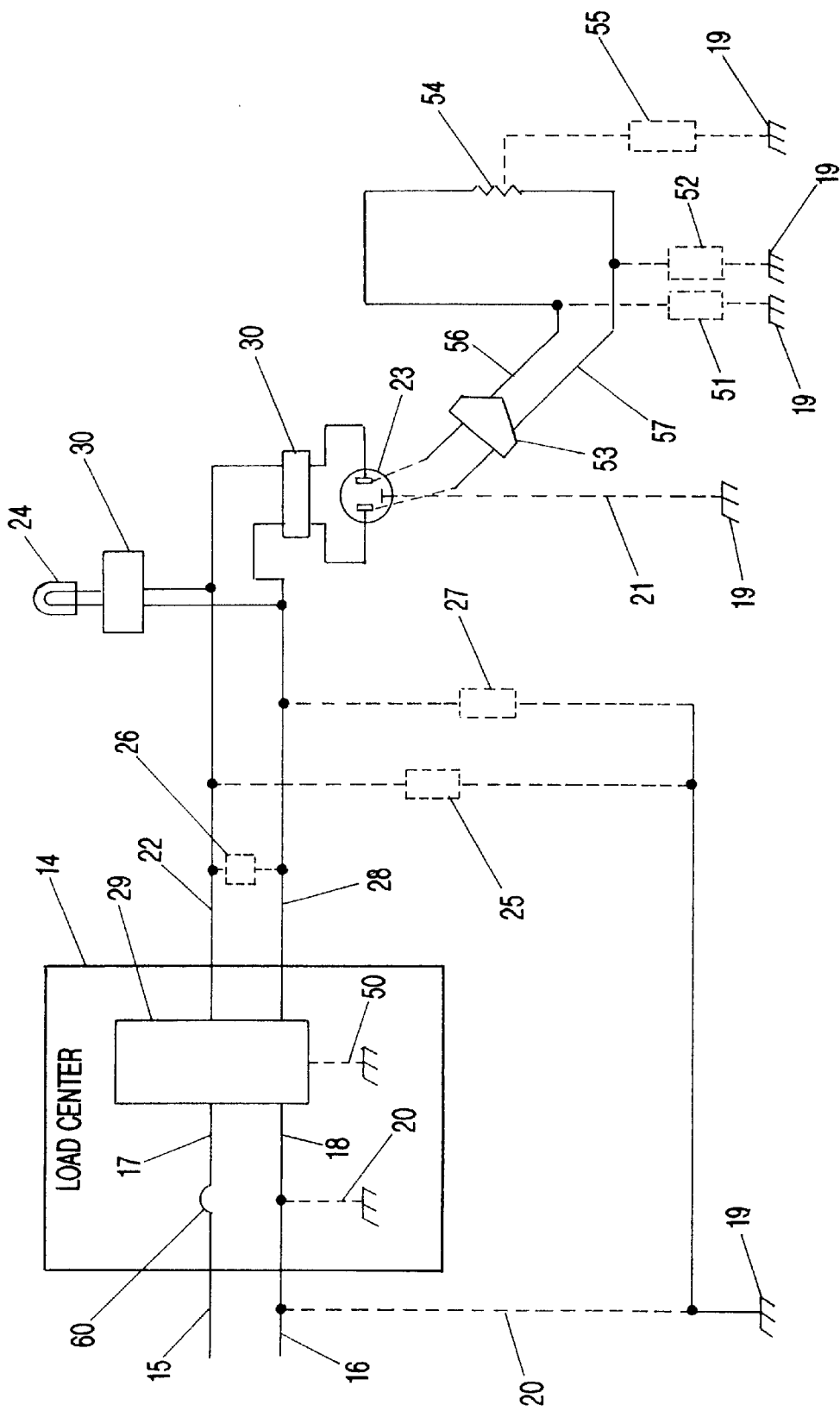
FIG. 3 depicts a block diagram of a building's electrical distribution system with modifications as per the present invention to provide fault protection.

FIG. 3 depicts a block diagram of a building's electrical distribution system with modifications as per the present invention to provide fault protection within the electrical distribution system in a building. The fault protection is implemented by adding a fault detection/circuit interrupt module 29 within the load center (a breaker box or the like) 14 and by adding a load conditioning module 30 at each outlet 23 and at each light 24 that is serviced by conductors 22 and 28. FIG. 3 depicts a single light 24 and a single outlet 23, although it should be recognized that the invention will work for any arbitrary number n of lights and any arbitrary number m of outlets (n not necessarily equal to m) connected in parallel to conductors 22 and 28. One advantage to this implementation is that it can be used to retrofit existing buildings, using existing wiring by simply adding the fault detection/circuit interrupt module 29 and one or more load conditioning modules 30. In addition to shock and arc fault protection within the branch electrical distribution wiring, an added benefit is that all appliances that are serviced by this branch will also accrue shock and arc fault protection. In FIG. 3, the appliance 54 is connected via a plug 53 and appliance wiring conductors 56 and 57 to an electrical outlet 23. A fault (current leakage path) 51 between the hot side 56 of the appliance cord and ground 19 or a fault (current leakage path) 52 between the neutral side 57 of the appliance cord and ground 19 is detected at the fault detection/circuit interrupt module 29, and power is removed from the branch conductors 22 and 28 until the fault condition is removed. In a similar way, a fault to ground 55 within the appliance load 54 will be detected and power will be removed from the branch until all faults are removed. Even if an electrical outlet 23 that is equipped with a load conditioning module 30 does not have an appliance load 54, a fault 25, 26 or 27 within the wiring connecting the load center 14 to the outlet 23 will be detected by the fault detection/circuit interrupt module 29 in the load center 14.

Figure 4:
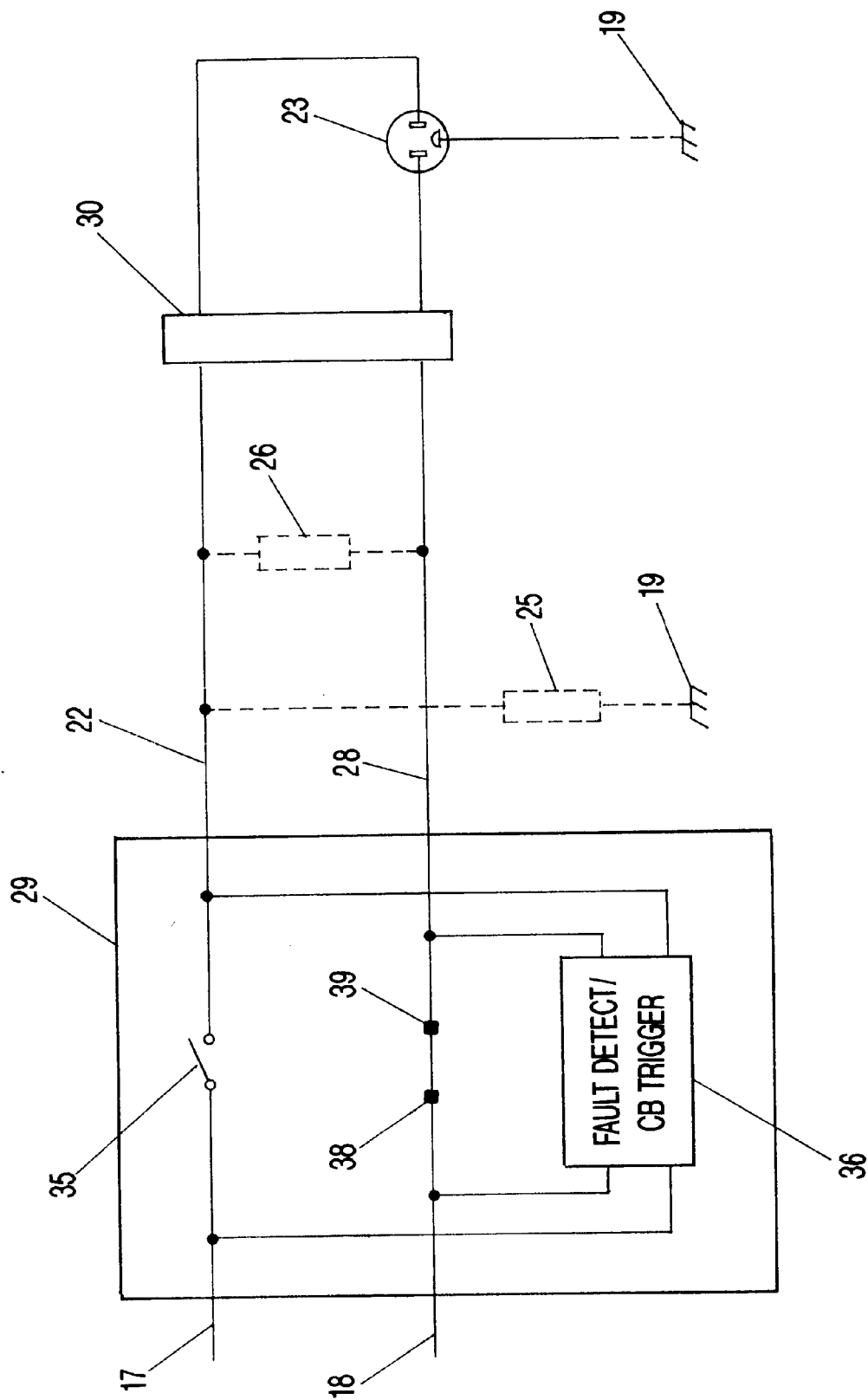
FIG. 4 depicts a block diagram of the theory of operation of the invention.

FIG. 4 illustrates the way in which the fault protection/detection system works. The fault detection/circuit interruption module 29 connects to the load center hot 17 and load center neutral 18. A switch 35 connects the load center hot conductor 17 to the hot conductor 22 connecting load center to outlets/lights. Switch 35 is used to allow (when closed) or interrupt (when open) the current flow in the conductor 22. In this way, switch 35 functions as a circuit breaker. In some embodiments it might be desirable to add a second switch to break the neutral side of the line. This optional second switch would be located between nodes 38 and 39 and would operate synchronously with switch 35.

In order to detect a fault, switch 35 will be opened during short time intervals with the fault detect/circuit breaker trigger 36 providing a high impedance current path around switch 35 through which a low level fault current could be sensed if it were present. At any time that a fault condition 25 and/or 26 is sensed, this condition will be detected by the fault detect/circuit breaker trigger 36 which then causes switch 35 to maintain an open position which will be maintained at least as long as faults 25 and/or 26 exist.

At the input to wall outlet 23, there is a load conditioning module 30 which serves to block current flow to the outlet 23 for short time intervals. In the absence of a fault condition, when the load conditioning module 30 blocks current flow, there will be no substantial current flowing in the hot conductor 22. However, if faults 25 and/or 26 exist, then even when the load conditioning module 30 blocks current flow to the appliance, there will be a sense current flow in hot conductor 22 through a high impedance in the fault detect/circuit breaker trigger 36 and through the faults 25 and/or 26. This current flow is recognized as a fault condition and causes the switch to remain open.

Accordingly, if the hot to ground fault 25 or hot to neutral fault 26 represents a human body making accidental contact with dangerous voltages then this invention will protect against electrical injury by detecting this as a fault condition and will prevent substantial current from flowing in hot conductor 22, thereby implementing shock protection. If the hot to ground fault 25 or hot to neutral fault 26 represents two conductors making a short circuit or arcing fault, for example through a carbonized path, then this invention will recognize a fault condition and will prevent substantial current from flowing in hot conductor 22, thereby implementing arc fault protection and preventing the dangerous heat generation that can cause electrical fires.

Although FIG. 4 depicts a single load, the theory extends to multiple loads such as outlets with appliances connected thereto and such as switched lights, provided that each light and each outlet so connected has a built-in load conditioning module 30.

Figure 5:
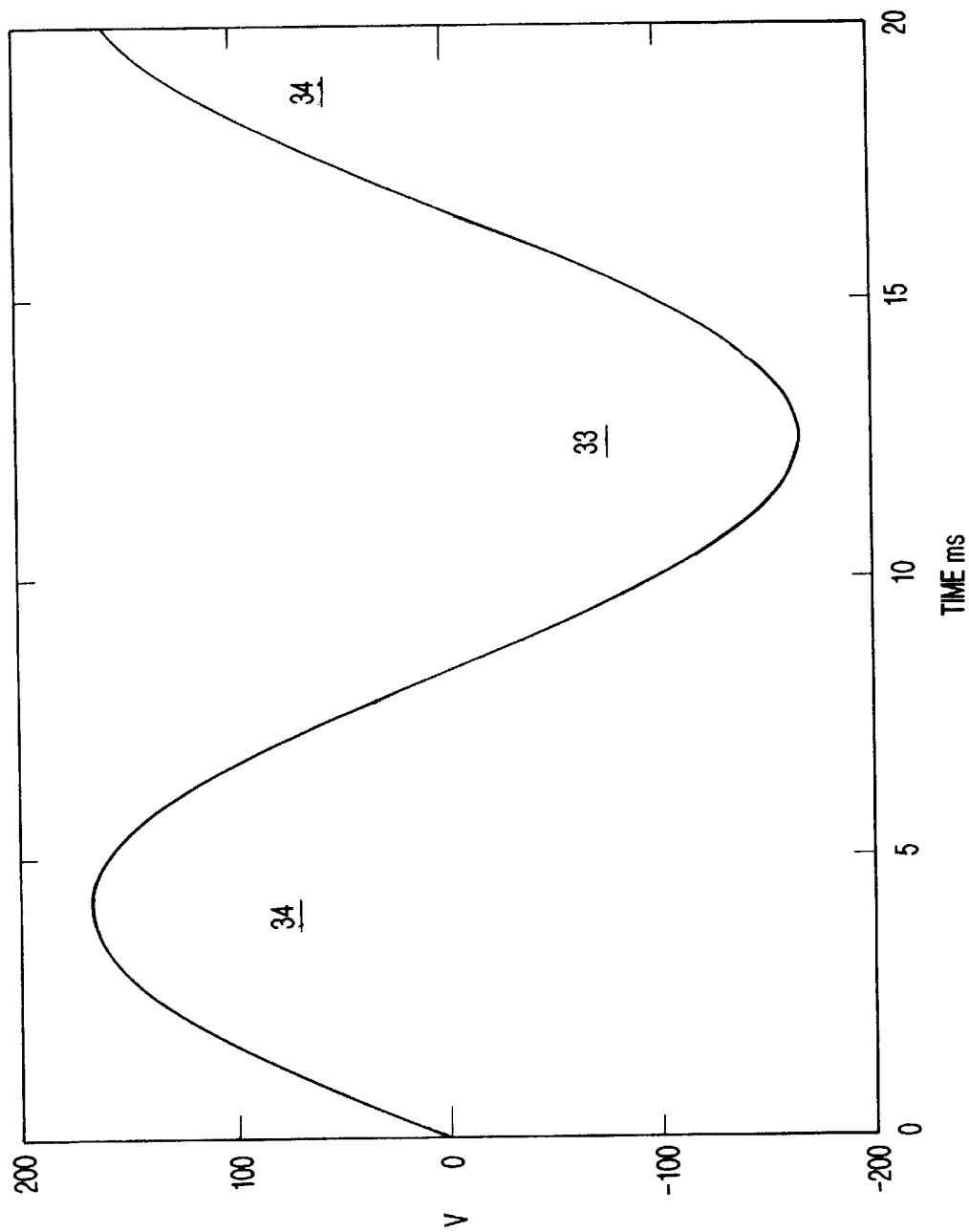
FIG. 5 is a sketch of approximately one and one fourth cycles of the AC voltage applied at the plug on the hot prong with respect to the neutral prong.

FIG. 5 depicts approximately 1.25 cycles of AC voltage at the load center hot conductor 17 as referenced to the load center neutral conductor 18. The negative half cycle 33 is defined as the time interval during each cycle of AC when the voltage at the load center hot conductor 17 has a value that is negative with respect to the load center neutral conductor 18. For example, FIG. 5 depicts a waveform corresponding to 60 cycles per second (a period of 16.66 milliseconds). In FIG. 5, the first 8.33 milliseconds corresponds to the positive half cycle 34 while the interval going from 8.33 milliseconds to 16.66 milliseconds corresponds to a negative half cycle 33 with zero crossings at 8.33 milliseconds and at 16.66 milliseconds. This then repeats.

Figure 6:
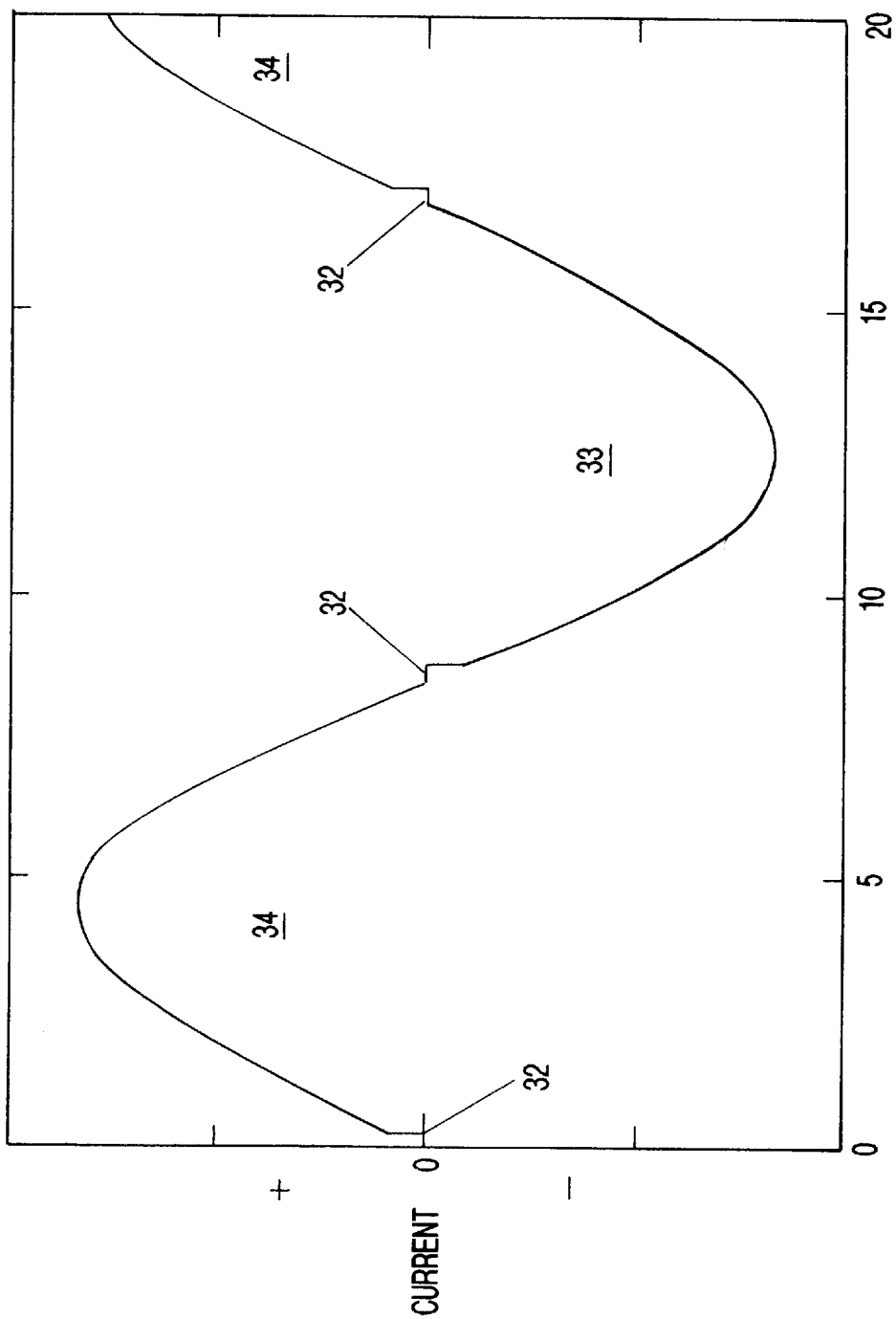
FIG. 6 is a sketch of AC load current, depicting the "dead zones" wherein current is inhibited from flowing within the load.

FIG. 6 depicts approximately 1.25 cycles of AC current flowing through the load conditioning module 30. The interval 32 represents a portion of the cycle when the current is inhibited from flowing through the load, that is, the current flow should be near zero. This interval (dead zone) could be of arbitrary duration and occur at arbitrary times but in most embodiments it will be convenient to have it occur twice every cycle, just subsequent to the zero crossings.

Figure 7:
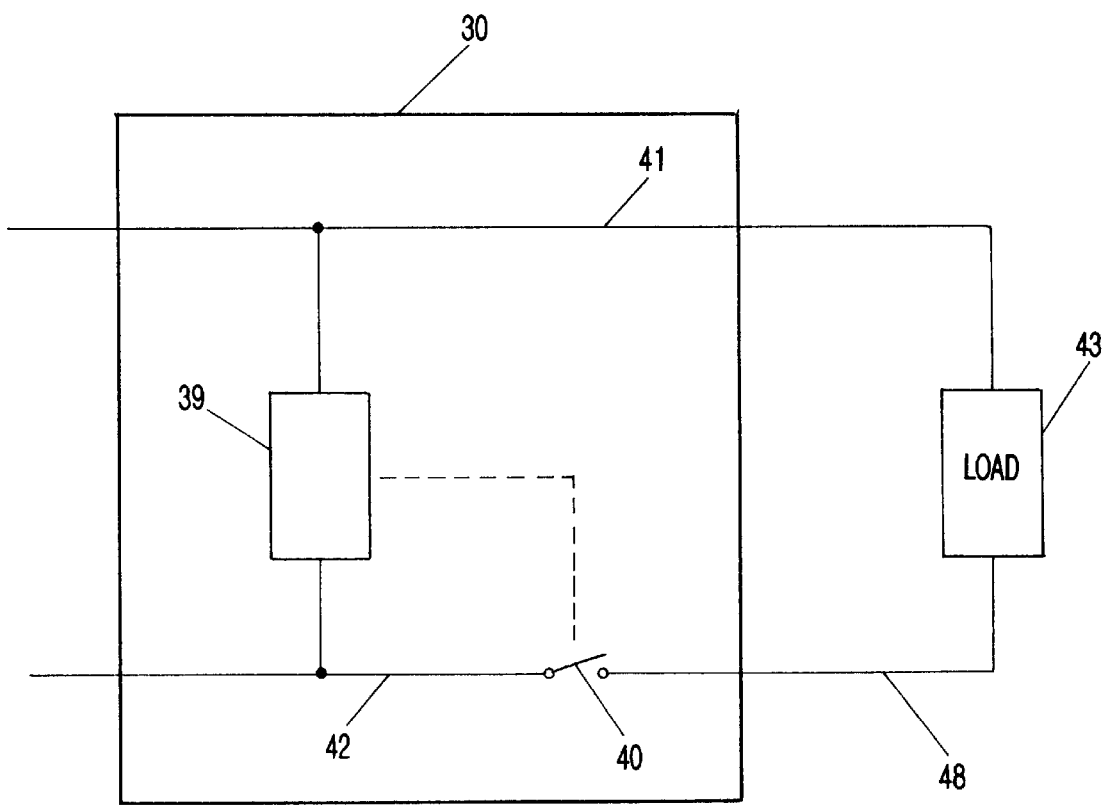
FIG. 7 illustrates one approach underlying the creation of a load conditioning circuit whereby a dead zone is imposed at all cyclic zero crossings of current.

FIG. 7 illustrates the basic approach underlying the creation of a load conditioning module 30 whereby a "dead zone" is imposed at all cyclic zero crossings of voltage. A load conditioning circuit controller 39 controls switch 40 depending upon the magnitude and polarity of the voltage sensed between conductor 42 and conductors 41 or between conductor 42 and conductor 48. Switch 40 is normally in a closed position. When the voltage between conductors 42 and 41 (or 48) is negative and increases to zero (a so-called zero crossing with positive slope), the switch 40 is opened for a preset time interval, thus breaking the series connection and forcing the current to be zero through the load 43 for that time interval. When the time interval is over, the load conditioning circuit controller 39 closes the switch 40 to enable current flow to the load 43. In the same manner, when the voltage between conductors is positive and decreases to zero (a so-called zero crossing with negative slope), switch 40 is opened for a preset time interval. The electrical load 43 in FIG. 7 could be a purely resistive load such as a switched incandescent light, in which case the electrical current flow through the load would be exactly like that depicted in FIG. 6 for a 60 hertz applied voltage where the operation of the switch (40 in FIG. 7) serves to implement the dead zone (32 in FIG. 6). The electrical load 43 in FIG. 7 could also be any resistive or capacitive appliance plugged into a wall outlet or the wall outlet itself (the wall outlet without an appliance plugged in would be a load 43 modeled as an infinite resistance).

Figure 8:
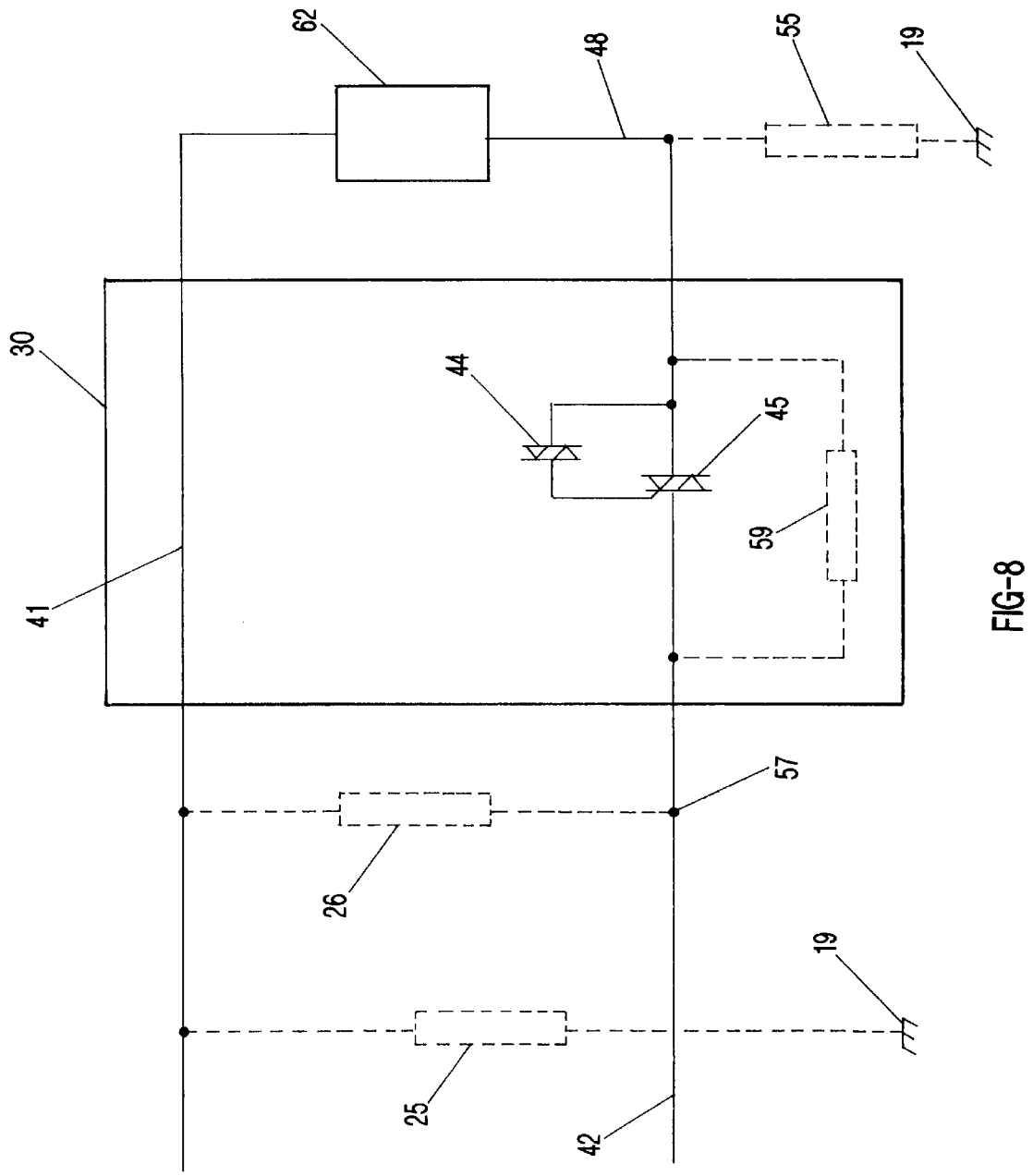
FIG. 8 depicts the electrical schematic of a specific embodiment of the load conditioning circuit whereby a bilateral trigger switch is used to trigger a triac during all but the intervals around a zero crossing.

FIG. 8 depicts the electrical schematic of a specific embodiment of the load conditioning module 30 whereby a bilateral trigger switch 44 is used to trigger a triac 45 to conduct electrical current through a load 62 during all but the intervals around a zero crossing. The bilateral trigger switch 44 is a bidirectional thyristor that is triggered from a blocking-to-conduction state for either polarity of applied voltage whenever the magnitude of the applied voltage exceeds a characteristic breakover voltage. The triac 45 turns off at zero crossings of current and remains off until triggered by the bilateral trigger switch 44 which turns on the triac 45 whenever the magnitude of the difference in polarity between conductors 42 and 48 is greater than the breakover voltage. Once turned on, the triac 45 conducts and allows current to flow through the load 62 for the remainder of the half cycle until the next zero crossing, at which time the triac 45 turns off.

Figure 9:
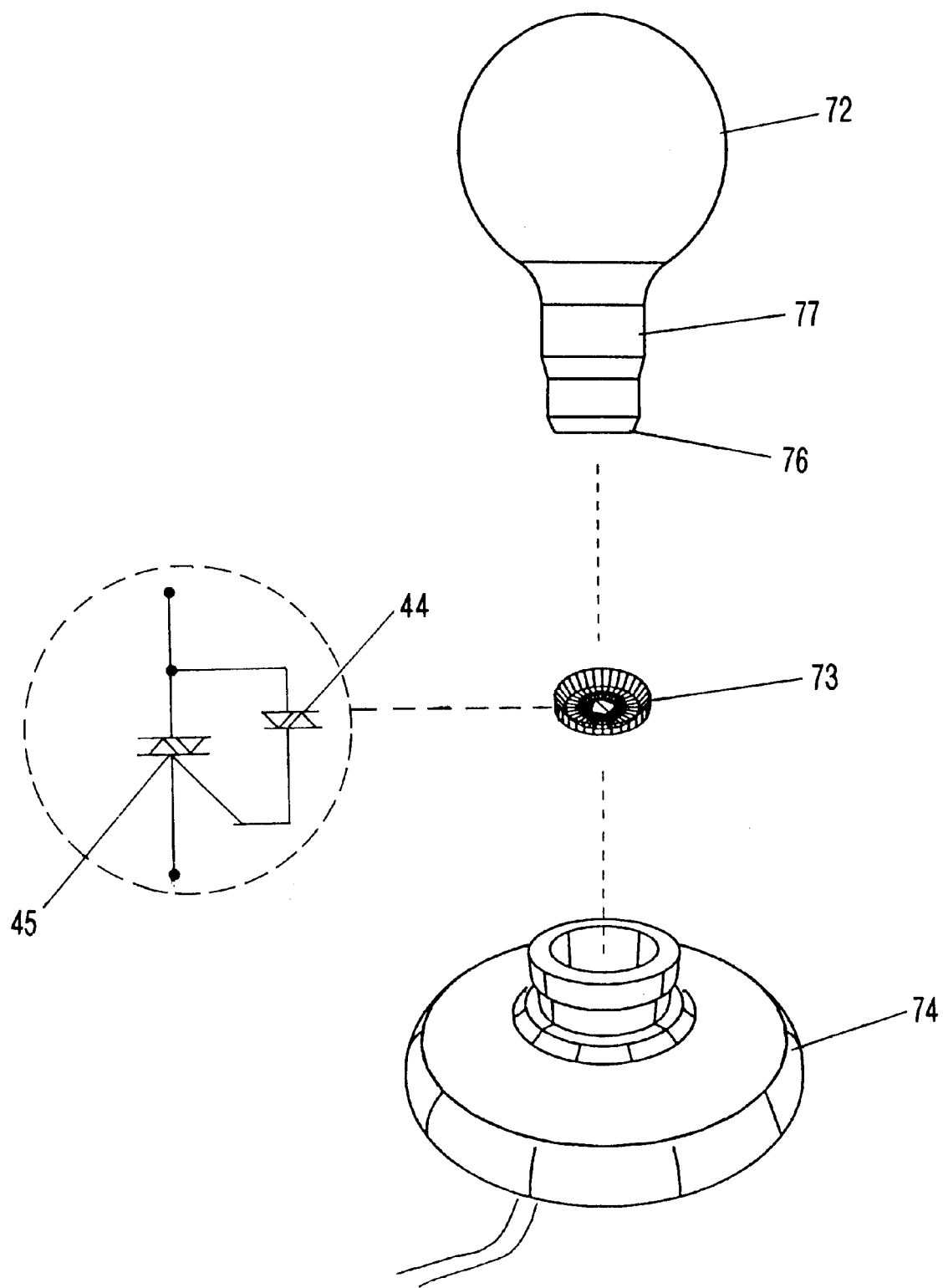
FIG. 9 is a mechanical drawing of a "button" style load conditioning circuit attachment that could be inserted into a light bulb socket to impose a dead zone.

FIG. 9 is a mechanical drawing of a "button" style load conditioning circuit 73 attachment that could be inserted into a light bulb socket 74 to impose a dead zone in the electrical current drawn by an incandescent light bulb 72. This is one example approach wherein the implementation of the fault protection system at an electric light maybe carried out without the need for special sockets or refixturing. The load conditioning circuit 73 consists of a triac 45 triggered by a bilateral trigger switch 44. Triac 45 is installed in the "button shaped" load conditioning circuit 73 to create a two terminal circuit element. The MT2 terminal of the triac is exposed on one side of load conditioning circuit 73. The MT1 terminal of the triac 45 is exposed on the other side of load conditioning circuit 73 (it does not matter which terminal goes where). Internal to the button load conditioning circuit 73, a bilateral trigger switch connects the gate of triac 45 to the MT2 terminal of triac 45. When installed in the socket between the light bulb 72 and the socket 74, the load conditioning module 73 is now series connected in the conductors that connect the load center to the light.

Figure 10:
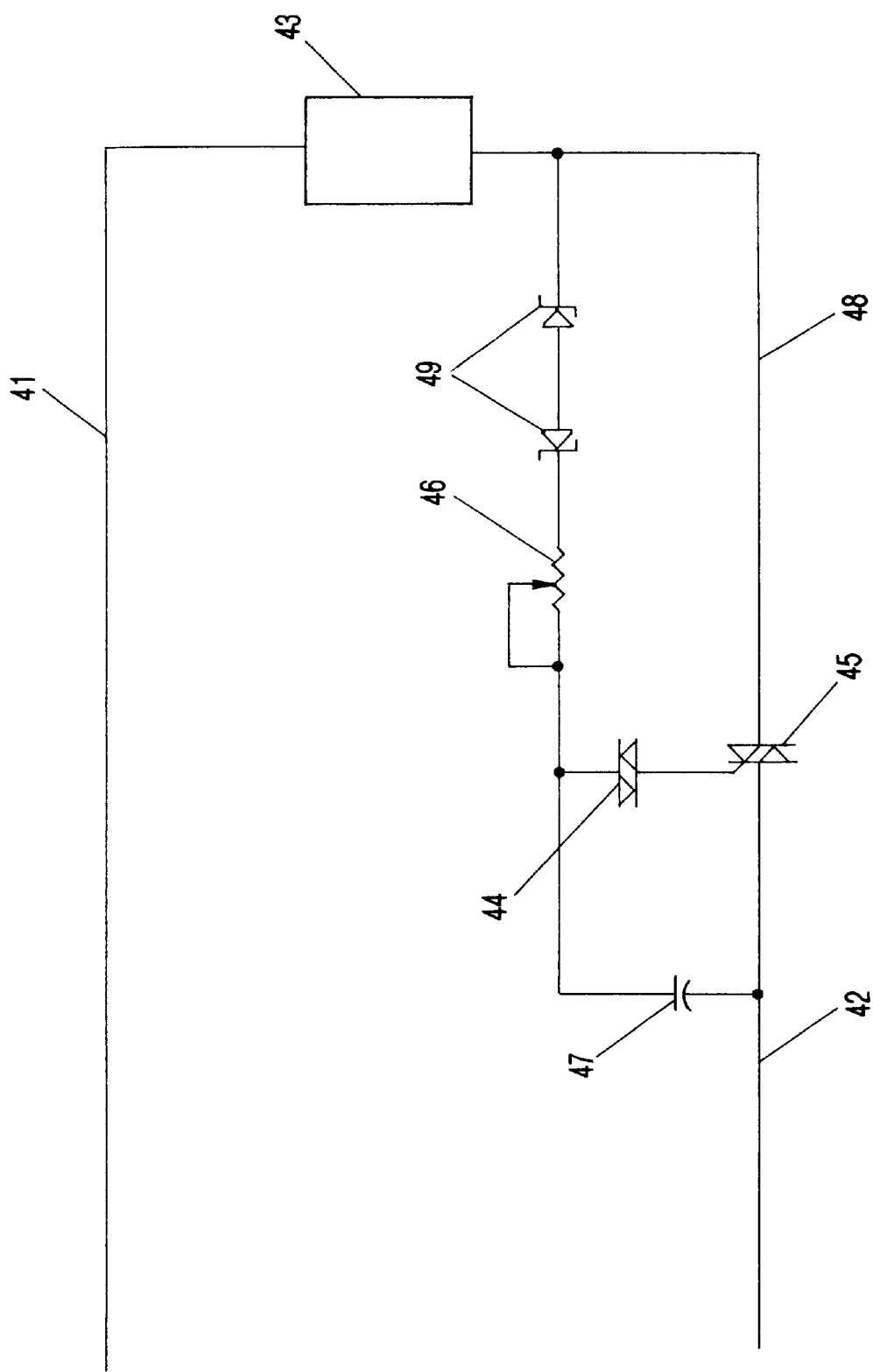
FIG. 10 depicts the electrical schematic of a second specific embodiment of the load conditioning circuit whereby the load conditioning circuit can serve a dual role of providing the dead zone for fault protection as well as providing a load controlling function.

FIG. 10 depicts the electrical schematic of a second specific embodiment of the load conditioning circuit whereby the load conditioning circuit can serve a dual role of providing the dead zone for fault protection as well as providing a load controlling function. The load 43 could be, for example, an incandescent light in which case the circuit can provide a dimming function, or the load 43 could be an electric fan, in which case the circuit can provide a speed control function. In FIG. 10 back to back zener diodes 49, serve to block the current flow through the variable resistance 46 to the capacitor 47 when the voltage magnitude between conductors 41 and 42 is less than the zener voltage. When the voltage magnitude between conductors 41 and 42 exceeds the zener voltage, capacitor 47 begins to be charged through variable resistor 46, the back to back zener diodes 49, and the load 43. Until the triac 45 is triggered by the bilateral trigger switch 44, the load current is limited to that current which charges the capacitor 47. When the voltage on capacitor 47 exceeds the breakover voltage on the bilateral trigger switch 44, the triac 45 is triggered and substantial load current is allowed to flow through the load. By adjusting the value of the variable resistor 46, phase control of the load may be implemented, essentially extending the dead zone in the waveform of the current flow through the load 43. If the variable resistor 46 has a minimum value, the load 43 will receive maximum rms current. If the variable resistor 46 has maximum value, the load 43 will receive minimum rms current.

Figure 11:
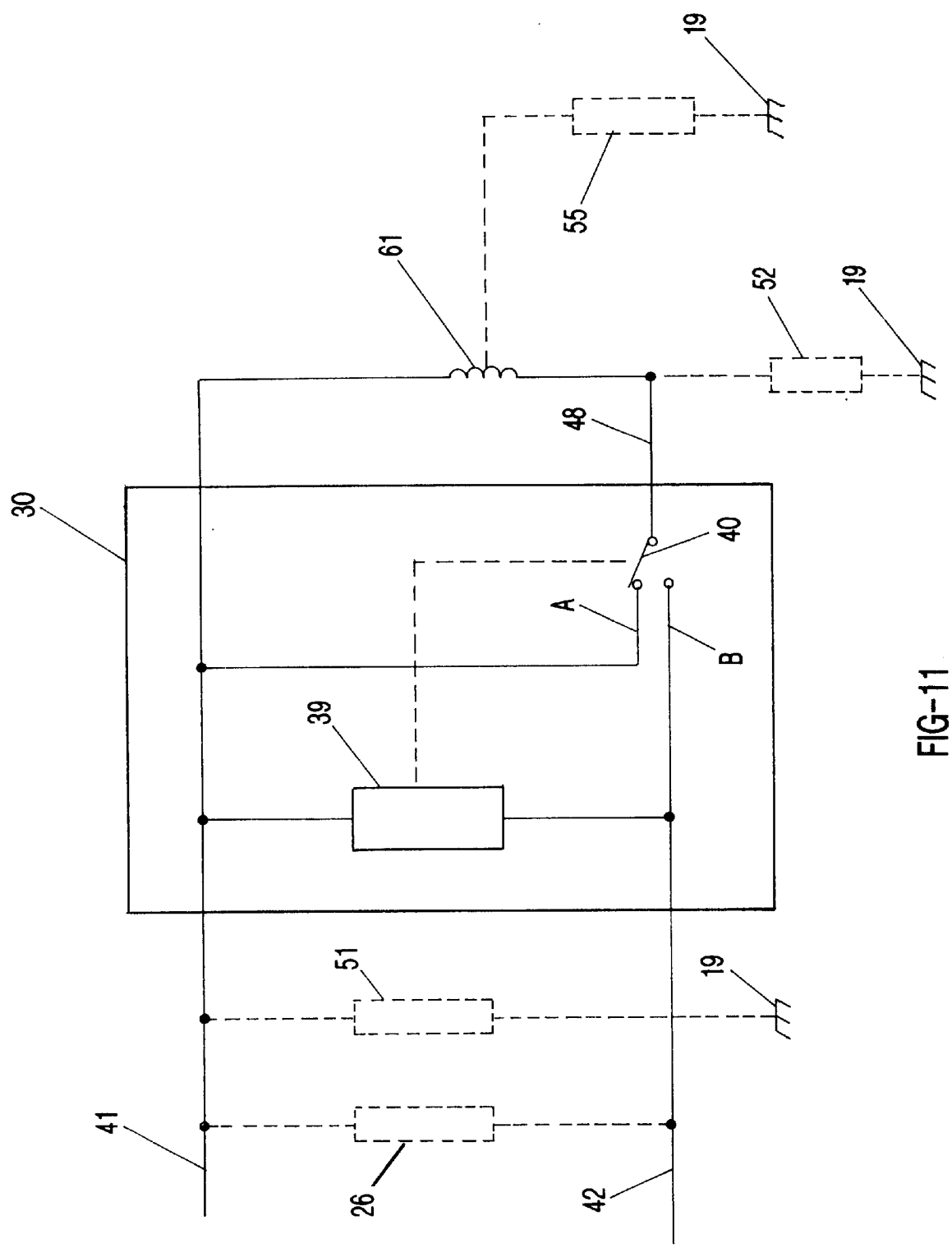
FIG. 11 illustrates an approach to making a load conditioning circuit which is useful for inductive loads.

FIG. 11 illustrates an approach to making a load conditioning module 30 which is useful for inductive loads 61 and will also work with capacitive and resistive loads. In this embodiment, a load conditioning circuit controller 39 controls switch 40. Possible faults that could be detected using this embodiment of the load conditioning module are depicted by dotted boxes and connections (dotted because they may or may not be present at a given time) include a hot to neutral fault 26, a hot to ground fault 51, a neutral to ground fault at the load 52, and a ground fault within the load 55. Recalling FIG. 6, wherein the sinusoidal current waveform within a conditioned load was distinguished as having positive values over time intervals denoted as 34, negative values over the time intervals denoted as 33, and an essentially zero value during the dead zones (interval 32), switch 40 would be in position B connecting the neutral side conductor 42 to the neutral side 48 of the load 61 for time intervals 33 and 34. During the time interval 32, switch 40 is placed in position A which connects the neutral side 48 of the load 61 to the hot side conductor 41, thereby shunting or "recycling" the current in the inductive load 61 back into itself. During this time interval 32, any or all of the faults 26, 51, 52 and 55, that were present would cause a current to flow in the hot side conductor 41, thus indicating a fault condition. For an inductive load 61 switch 40 will be controlled to be at all times either in position A or position B, otherwise a large commutating voltage could be developed across the inductance of the load due to the rapid change in current when switch 40 was opened. In the cases of purely resistive, purely capacitive, or mixed resistive-capacitive loads, position A can be open rather than connected to the hot side conductor 41, in which case FIG. 11 becomes identical to FIG. 7 and faults 26, 51, 52, and 55 can still be detected.

Figure 12:
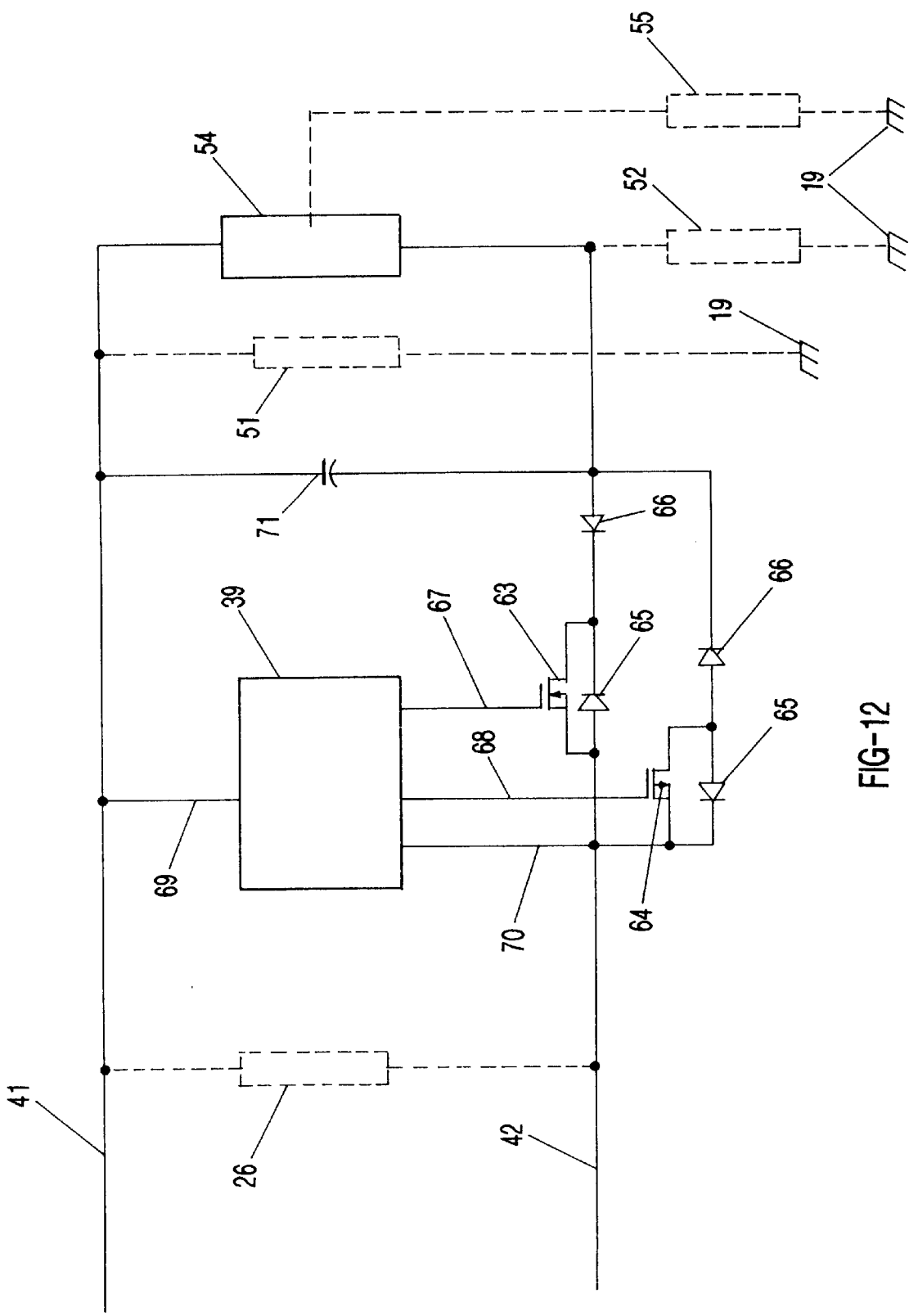
FIG. 12 is an electrical schematic of a specific embodiment of a load conditioning circuit that is suitable for inductive loads.
Figure 13:
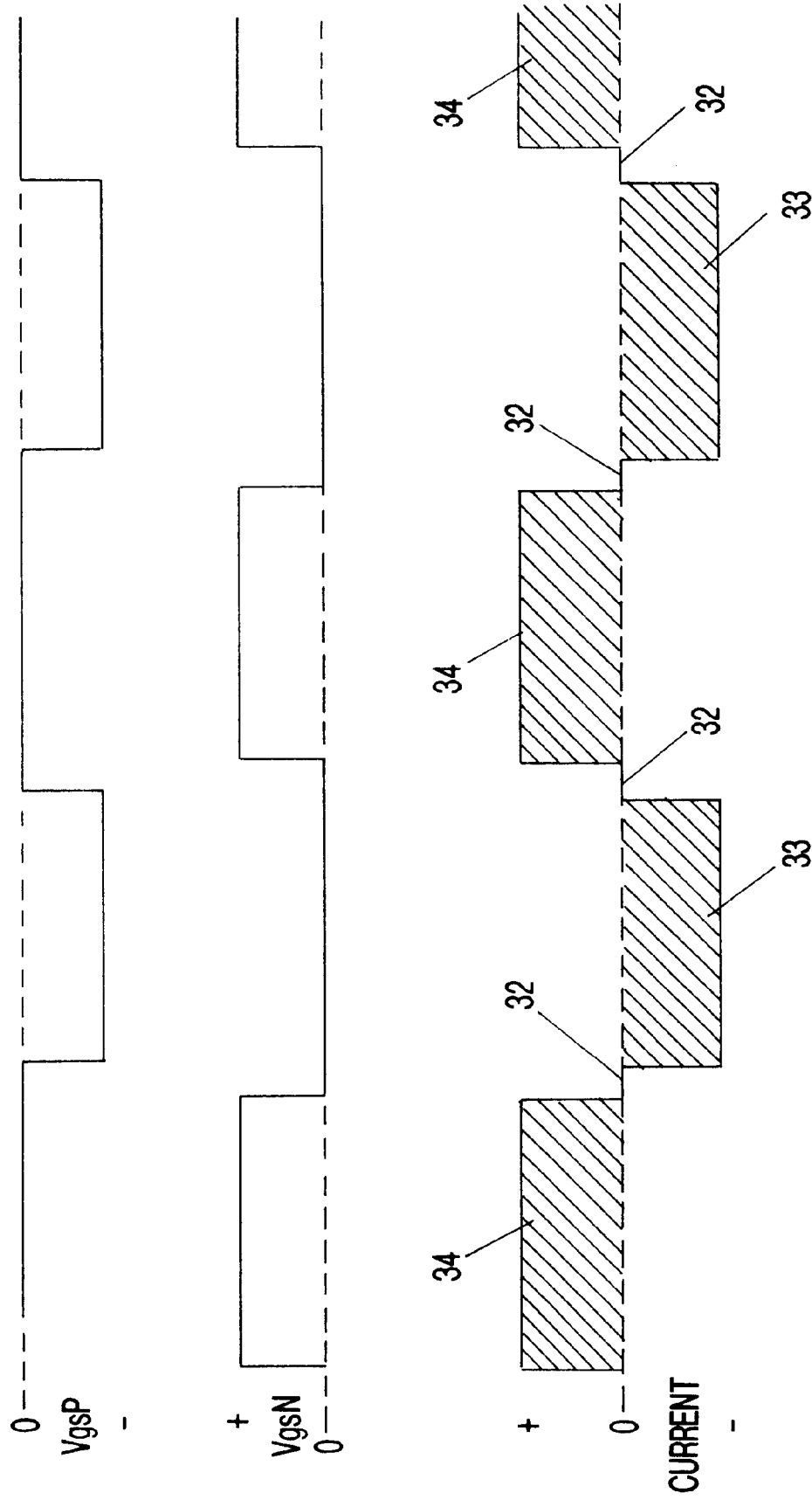
FIG. 13 depicts example control signals that might be generated by the load conditioning circuit controller.

FIG. 12 is an electrical schematic of a specific embodiment of a load conditioning circuit that is suitable for all loads. This is a specific implementation of the approach suggested in FIG. 11. To reduce any comutating voltage developed across an appliance load 54, a commutating capacitor 71 is used. Metal oxide semiconductor field effect transistors (MOSFET's) are used as the series switch of the load conditioning circuit. MOSFET transistors 63 and 64 can only control current flow in one direction. They generally have a body diode 65 internally connected which conducts current flowing in the reverse direction. To prevent reverse current flow, current steering diodes 66 are used. Using both an NMOS transistor 63 and a PMOS transistor 64 allows a simple method to switch current flow in both directions where the NMOS transistor 63 controls current during the positive half cycle 34 and the PMOS device controls current during the negative half cycle 33. The load conditioning circuit controller 39 receives its power from the hot side conductor 41 and neutral side conductor 42. The load conditioning circuit controller 39 might be a microcontroller. The load conditioning circuit controller 39 must be chosen so that it does not itself draw appreciable current during the deadzone interval 32 or it would be recognized as a fault FIG. 13 depicts the control signals that must be furnished by the load conditioning circuit controller 39 in order to implement the embodiment in FIG. 12 for making a load conditioning circuit. The top trace in FIG. 13 depicts the turn-on voltage applied to the gate 68 of the PMOS transistor 64, with respect to the neutral side conductor 42. The PMOS transistor 64, is an enhancement device that will conduct when a sufficiently negative gate voltage is applied, but is nonconducting with zero or positive gate voltages. The voltage at gate 67 for the NMOS device 63 is shown as the middle trace on FIG. 13. The NMOS transistor 63, is an enhancement device which becomes conducting with a sufficiently positive gate voltage but is nonconducting with zero or negative gate voltages. The bottom trace depicts the direction (but not relative magnitude) of current flow in the hot side conductor 41 under one example control profile. The dead zones 32 indicate intervals wherein current is blocked from flowing into the load in the absence of a fault condition.

Figure 14:
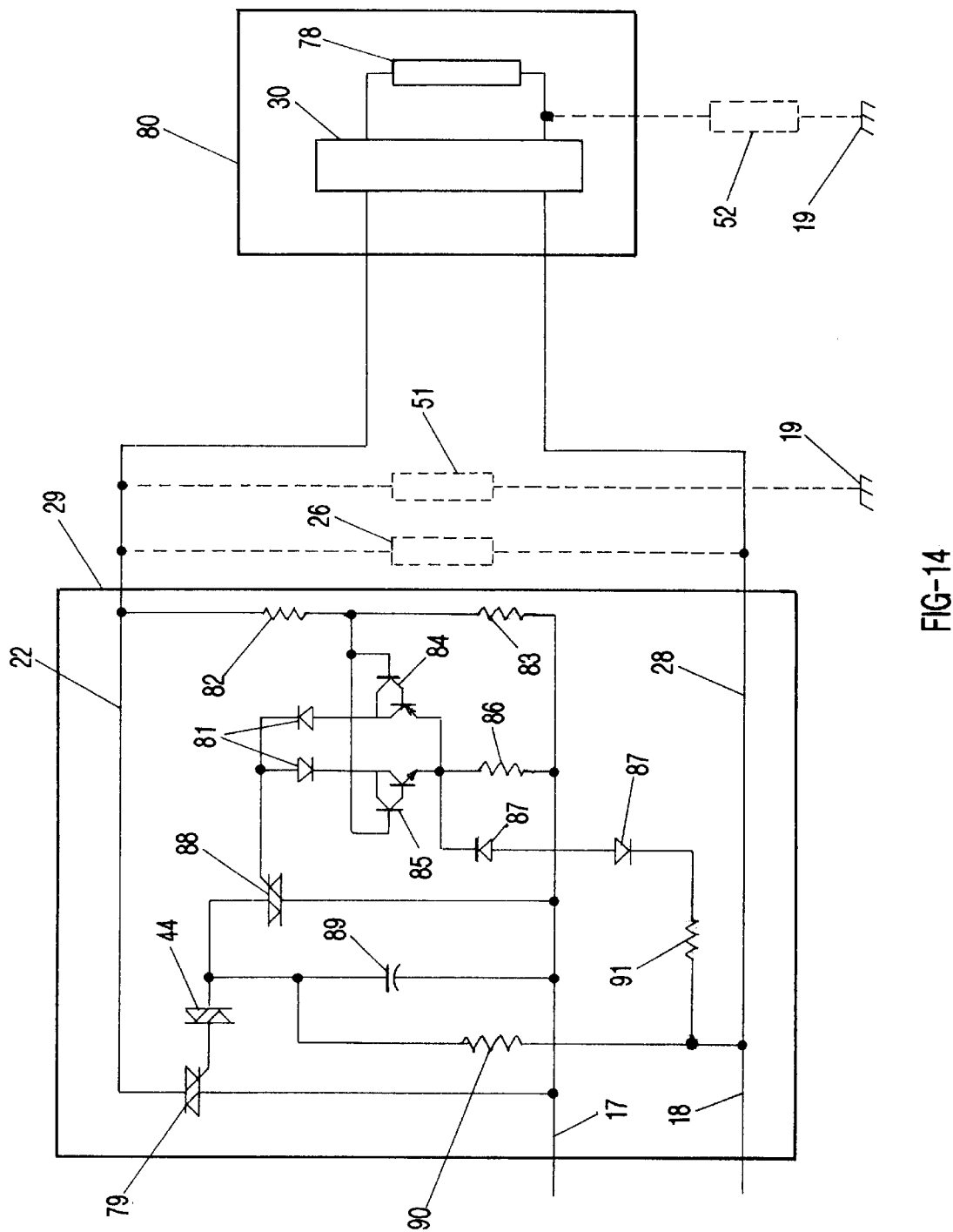
FIG. 14 is an electrical schematic of an embodiment of the fault detect circuitry wherein circuit interruption occurs at the hot side of the line at the load center upon the detection of a fault condition.

FIG. 14 is an electrical schematic of one embodiment of the fault detect circuitry wherein circuit interruption occurs at the hot side of the line at the load center upon the detection of a fault condition. The fault detect/circuit interrupt module 29 has load center hot 17 and load center neutral 18 supplying the input power. The hot conductor connecting load center to outlets/lights 22 and neutral conductor exiting load center 28 are the means by which power is delivered from the load center to the load conditioning module 30 and the load 78, the load 78 representing, for example, a light or an outlet or an arbitrary number of appliances connected to outlets. At the beginning of any half cycle, the current interrupting triac 79 is nonconducting until such time as it is fired by the bilateral trigger switch 44. This serves to give a dead zone just after the zero crossing, until such time (in the absence of a fault) as the applied voltage exceeds the bilateral trigger switch triggering voltage. At the beginning of any half cycle, the fault latch triac 88 is unfired.

At the beginning of the positive half cycle, with triacs 79 and 88 unfired, a small detection current through the series combination of resistors 82, 83 and any fault resistances 26 and/or 51, and/or 52 if present, will serve to fire the PNP Darlington transistor 84 which serves to trigger the fault latch triac 88 which in turn discharges the triac trigger capacitor 89, thereby preventing the bilateral trigger switch 44 from attaining the breakover voltage and thereby preventing the current interrupting triac 79 from firing and preventing current from being supplied to the load for the balance of the positive half cycle. On the other hand, if no fault resistance is present, the triac triggering capacitor 89 charges through charging resistor 90 until its voltage exceeds the breakover voltage of the bilateral trigger switch 44, causing current to be delivered to the gate of the current interrupting triac 79, causing the triac 79 to turn on and to deliver power to the load. Once the current interrupting triac 79 has been fired, the circuit is insensitive to a fault condition until the beginning of the next half cycle.

For the negative half cycle, the circuit functions in an identical manner as for the positive half cycle except that the polarities are reversed through all devices and the NPN Darlington 85 is active in the case of a fault condition instead of the PNP Darlington 84.

Figure 15:
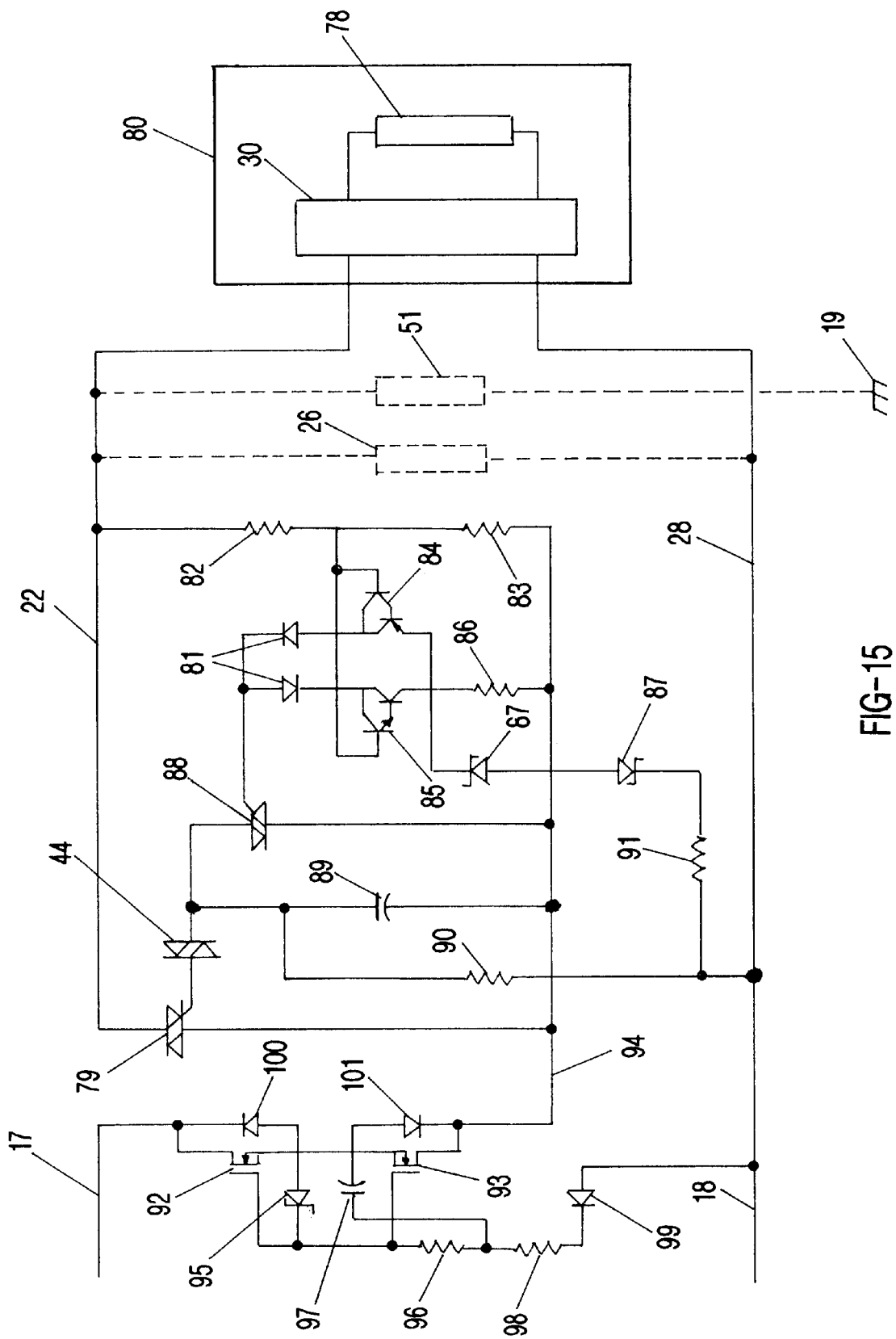
FIG. 15 is an electrical schematic of an embodiment similar to that depicted in FIG. 14 except that the circuit also has a short circuit current limiting feature that inhibits large surge currents from occurring prior to the detection of a fault condition.

Once fired, in order for current interrupting triac 79 to stay fired, load current must be conducted by the triac 79. In the event that the load conditioning circuit 30 does not draw a current, even though the current interrupting triac 79 has been fired, the triac trigger capacitor 89 will begin to charge up again through charging resistor 90. If no fault is detected, when the voltage on the triac trigger capacitor 89 reaches the firing voltage of the bilateral trigger switch 44, it will again fire and deliver gate current to the current interrupting triac 79. This process will repeat until the load draws sufficient current to latch the current interrupting triac 79 in an on condition for the remainder of the half cycle. In the absence of back to back zeners 87 and control resistor 91 it might be possible for the load conditioning circuit 30 to draw a low level current while the triac trigger capacitor 89 is being recharged after a failed pervious attempt. This condition would then be detected as a fault with fault latch triac 88 being fired and inhibiting any further attempted firing of the current interrupting triac 79. To prevent this condition, the back to back zener diodes 87 will conduct at a predetermined voltage. Once this voltage is reached, current is conducted through the control resistor 91, thereby developing a voltage across the emitter resistor 86. As the magnitude of the voltage across the emitter resistor 86 increases, the sensing voltage threshold at the base of the Darlington transistors also increases until the voltage at the emitters of the Darlington transistors exceeds the sensing range of the circuit, thus preventing any additional fault sensing until near the very end of the half cycle. Consequently, the role played by opposing zeners 87, together with control resistor 91, is to allow a predefined current sense window during which a fault will be detectable. This is important if there are multiple load conditioning circuits 30, each of which having a different firing voltage and consequently a different dead zone length. This is also important if the load conditioning circuit 30 is used in conjunction with phase power control as depicted in FIG. 10, because the dead zone during phase control may be as wide as the entire half cycle, In FIG. 14, if a very low impedance fault such as a short circuit occurs, the current interrupting triac 79 is required to carry this current for as much as one half cycle before a fault condition is recognized. This half cycle short circuit current can be limited by modifying the circuit shown in FIG. 14 to that depicted in FIG. 15. In FIG. 15, two NMOSFETs 92 and 93 have their gates connected together and their sources connected together. The drain of NMOSFET 92 is connected to the incoming hot conductor 17. The drain of NMOSFET 93 is connected to the hot input to the fault detecting circuit 94. Zener diode 95 connects between the gates and sources on the NMOSFETs 92 and 93 and regulates the positive gate voltage applied to NMOSFETs 92 and 93. This voltage is provided through resistor 96 from capacitor 97 which is in turn charged through resistor 98 and diode 99 from the load center neutral wire 18. During the negative half cycle (the period when the hot conductor 17 is more negative in potential than the neutral conductor 18) diode 99 will conduct and charge capacitor 97 through resistor 98, diode 99 and body diode 100. Diode 99 will prevent charge capacitor 97 from discharging during subsequent positive half cycles. The voltage maintained during both half cycles at the gates of the two NMOSFETs will be a fixed DC value due to zener regulator 95. During the negative half cycle, NMOSFET 93 will conduct current through body diode 100. However, the amount of current that can be drawn will be limited by the gate voltage (the voltage on zener regulator 95) and by the internal drain resistance. In a similar way, during the positive half cycle, NMOSFET 92 will conduct current through body diode 101 and will limit current according to the value of the gate voltage and the drain resistance characteristic of the NMOSFET. Consequently, the circuit elements between conductors 17 and 94 in FIG. 15 serve one role only and that is to limit the maximum current that can flow in conductor 94 in the case of an overload current condition such as a short circuit.

FIG. 16 depicts a load conditioning circuit (which in its most general form consists of a load conditioning circuit controller 39 controlling a switch 40 (see FIG. 7) at a load 43), together with an open ground and wiring transposition detector circuit. Resistor 102 must have a value higher than that of the maximum detectable fault resistance and resistor 105 must have a value well under the maximum detectable fault resistance. The gate of faulting triac 104 is connected to an assumed ground 107. This is a point within an outlet or light which is assumed to be grounded. The dotted line 103 indicates a connection to ground. If this connection does in fact exist, the faulting triac 104 is unable to fire because its gate voltage will have the same potential as the neutral conductor 42. Consequently, the triac 104 acts as an open circuit and does not impact the operation of the system. If there is no connection 103 (corresponding to an open ground condition) then ground sensing resistor 102 provides gate current to fire the fault triac 104, which in turn simulates a hot to neutral fault by placing fault limiting resistor 105 across the lines 41 and 42 thereby creating a fault. This in turn causes current interruption at the load center for the entire branch. Equivalently, if the ground conductor 19 is wired to the hot conductor 41, it will cause a current to flow through the fault triac 104, simulating a fault condition and causing current interruption at the load center for the entire branch. The role of fault limiting resistor 105 is to protect the gate of the fault triac 104. If the hot and neutral wires are transposed at the load or throughout the branch, regardless of whether the ground is connected, the circuit in FIG. 16 will detect the condition and trigger the fault triac 104, thereby simulating a fault condition and causing current interruption of the hot conductor at the load center for the entire branch.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed is:

1. An electrical shock and arc fault protection apparatus for an alternating current electrical distribution system comprising a load center, at least one load, and no more than two current-carrying conductors connecting said load center with each of said at least one load; said apparatus comprising:
    means for bidirectionally blocking substantially all of the electrical current flow to the one or more loads for predetermined time intervals;
    means for detecting electrical current in one of said two conductors; and
    means for interrupting said electrical current in said two conductors if an appreciable current in one of said two conductors is detected during one of said predetermined time intervals.

2. The electrical shock and arc fault protection apparatus of claim 1 wherein said electrical current interrupting means is disposed within said load center.

3. The electrical shock and arc fault protection apparatus of claim 1 wherein said bidirectionally blocking means comprises a non-linear circuit element located at or near each of said at least one load.

4. The electrical shock and arc fault protection apparatus of claim 1 wherein said bidirectionally blocking means substantially blocks current to said at least one load when the magnitude of a voltage source is below a predetermined threshold.

5. The electrical shock and arc fault protection apparatus of claim 1 wherein said at least one load may be an electric light.

6. The electrical shock and arc fault protection apparatus of claim 5 wherein said bidirectionally blocking means is configured as a two terminal circuit element that is inserted in a light socket.

7. The electrical shock and arc fault protection apparatus of claim 1 wherein said bidirectionally blocking means is disposed within a wall outlet.

8. The electrical shock and arc fault protection apparatus of claim 7 wherein said at least one load may be any appliance that plugs into a wall outlet.

9. The electrical shock and arc fault protection apparatus of claim 1 wherein said bidirectionally blocking means is also used for phase control to dim a light or control a motor.

10. The electrical shock and arc fault protection apparatus of claim 1 wherein one of the said two conductors is designed to carry electrical current during normal operation and is required by electrical code to be electrically grounded at some point.

11. The electrical shock and arc fault protection apparatus of claim 10 wherein if said current carrying conductor is not grounded, the electrical current interrupting means is triggered.

12. The electrical shock and arc fault protection apparatus of claim 1 wherein if neutral and hot conductors are transposed a fault condition is imposed and the electrical current interrupting means is triggered.

13. The electrical shock and arc fault protection apparatus of claim 1 wherein the electrical current interrupting means prevents electrical current flow of a magnitude in excess of a predetermined amount.

14. The electrical shock and arc fault protection apparatus of claim 1 wherein the electrical current interrupting means interrupts current flow in the circuit within one half cycle of an occurrence of a fault condition.

15. The electrical shock and arc fault protection device of claim 1 wherein the electrical current interrupting means automatically restores current to said at least one load within one half cycle of removal of a fault condition.

16. The electrical shock and arc fault protection device of claim 1 wherein the electrical current interrupting means automatically restores current to said at least one load within a preset time period after removal of a fault condition.

17. The apparatus of claim 1 wherein said apparatus is installable to utilize only existing electrical distribution system wiring as said two conductors, thereby avoiding a need for additional wires.

18. The apparatus of claim 17 wherein said existing electrical distribution system wiring comprises a single ungrounded conductor under ordinary fault-free operation.

19. The apparatus of claim 1 wherein said apparatus is capable of detecting electrical leakage from within the load to ground.

20. The apparatus of claim 1 wherein said bidirectional blocking means comprises switch means for interrupting current flow from said load center to said at least one load and for simultaneously shunting said at least one load, thereby reducing commutating voltages in inductive loads due to electrical discontinuities.

21. An electrical shock and arc fault protection method for an alternating current electrical distribution system comprising a load center, at least one load, and no more than two current-carrying conductors connecting said load center with each of said at least one load, the method comprising the steps of:
    a) bidirectionally blocking substantially all of the electrical current flow to the at least one load for predetermined time intervals;
    b) detecting electrical current in one of the two conductors; and c) interrupting the electrical current in said two conductors if an appreciable current in one of said two conductors is detected during one of the predetermined time intervals.

22. The method of claim 21 further comprising the step of disposing electrical current interrupting means within the load center.

23. The method of claim 21 further comprising the step of providing a non-linear circuit element at the at least one load.

24. The method of claim 21 further comprising the step of blocking current to the at least one load when the magnitude of a voltage from a voltage source is below a predetermined threshold.

25. The method of claim 21 comprising the step of providing an electric light as the at least one load.

26. The method of claim 25 further comprising the step of configuring bidirectionally blocking means as a two-terminal element insertable in a light socket.

27. The method of claim 21 further comprising the step of disposing bidirectionally blocking means within a wall outlet.

28. The method of claim 27 comprising the step of providing an appliance that plugs into a wall outlet as the at least one load.

29. The method of claim 21 further comprising a step selected from the group consisting of phase controlling light dimming and motor speed adjusting in addition to bidirectionally blocking.

30. The method of claim 21 further comprising the step of grounding one of the two conductors.

31. The method of claim 30 further comprising the step of triggering electrical current interrupting means if one of the two conductors is not grounded.

32. The method of claim 21 further comprising the steps of imposing a fault condition and triggering electrical current interrupting means if said two conductors are transposed.

33. The method of claim 21 further comprising the step of preventing current flow in excess of a predetermined amount.

34. The method of claim 21 further comprising the step of interrupting current flow within one-half cycle of the occurrence of a fault condition.

35. The method of claim 21 further comprising the step of restoring current flow within one-half cycle after removal of a fault condition.

36. The method of claim 21 further comprising the step of restoring current flow within a preset time interval after removal of a fault condition.

37. The method of claim 21 wherein the method is performed using only existing electrical distribution system wiring as the two conductors, thereby avoiding a need for additional wires.

38. The method of claim 37 wherein the method is performed using only existing electrical distribution system wiring comprising a single ungrounded conductor under ordinary fault-free operation.

39. The method of claim 21 wherein the detecting step detects electrical leakage from within the load to ground.

40. The method of claim 21 wherein the blocking step comprises interrupting current flow between said load center and said at least one load and concurrently shunting energy stored in said at least one load, thereby avoiding large commutating voltages occurring when inductive load currents are interrupted.

41. An electrical shock and arc protection apparatus for an alternating current electrical distribution system comprising a load center, at least one load, and no more than two current-carrying conductors connecting said load center with each of said at least one load; said apparatus comprising:

a first module for detecting a fault and interrupting current to said at least one load while said fault is detected, said first module being connected to and adjacent said load center; and a second module for bidirectionally blocking current flow to said at least one load for predetermined time intervals, said second module being connected to and adjacent said at least one load.

42. The apparatus of claim 41 wherein said second module comprises at least one non-linear circuit element.

43. The apparatus of claim 41 wherein said second module blocks current to the load when the magnitude of the applied voltage is below a predetermined threshold.

44. The apparatus of claim 41 wherein said second module is disposed within a wall outlet.

45. The apparatus of claim 41 wherein said second module is disposed within a light bulb socket.

46. The apparatus of claim 41 wherein said second module further comprises phase-controlled current limiting means.

47. The apparatus of claim 41 wherein said first module interrupts current to said at least one load if one of said two conductors is ungrounded.

48. The apparatus of claim 41 wherein said first module interrupts current to said at least one load if said two conductors are transposed.

49. The apparatus of claim 41 wherein said first module interrupts current flow to said at least one load within one-half cycle of detection of a fault.

50. The apparatus of claim 41 wherein said first module restores current to said at least one load within a preset time period after removal of a fault.

51. The apparatus of claim 41 wherein said first module further comprises a current interrupting triac, a capacitor, and Darlington configured transistors.

52. The apparatus of claim 43 further comprising short circuit current limiting means.

53. The apparatus of claim 41 wherein said second module comprises switch means for interrupting current between said load center and said at least one load and switch means for shunting said at least one load, thereby avoiding large commutating voltages occurring when electrical current in an inductive load is interrupted.

54. A load-conditioning apparatus for fault detection in an electrical distribution system, said apparatus comprising:

automatic means for bidirectionally interrupting current flow between an electrical source and an electrical load during predetermined time intervals; and automatic means for shunting said electrical load and thereby recirculating reactive energy back through said electrical load during said time intervals.

* * * * *